US007233978B2

(12) United States Patent
Overton et al.

(10) Patent No.: US 7,233,978 B2
(45) Date of Patent: Jun. 19, 2007

(54) METHOD AND APPARATUS FOR MANAGING LOCATION INFORMATION IN A NETWORK SEPARATE FROM THE DATA TO WHICH THE LOCATION INFORMATION PERTAINS

(75) Inventors: John K. Overton, Chicago, IL (US); Stephen W. Bailey, Andover, MA (US)

(73) Assignee: Econnectix, LLC, Chicago, IL (US)

( * ) Notice: Subject to any disclaimer, the term of this patent is extended or adjusted under 35 U.S.C. 154(b) by 810 days.

(21) Appl. No.: 09/872,736

(22) Filed: Jun. 1, 2001

(65) Prior Publication Data

US 2002/0032787 A1 Mar. 14, 2002

Related U.S. Application Data

(63) Continuation-in-part of application No. 09/661,222, filed on Sep. 13, 2000, now Pat. No. 7,103,640, and a continuation-in-part of application No. 09/503,441, filed on Feb. 14, 2000, now abandoned, and a continuation-in-part of application No. 09/367,461, filed on Aug. 13, 1999, now abandoned, and a continuation-in-part of application No. 09/111,896, filed on Jul. 8, 1998, now abandoned.

(60) Provisional application No. 60/277,408, filed on Mar. 19, 2001, provisional application No. 60/209,070, filed on Jun. 2, 2000.

(51) Int. Cl.
*G06F 15/16* (2006.01)

(52) U.S. Cl. ........................ 709/217; 709/226; 709/232

(58) Field of Classification Search ................ 718/105; 709/203, 206, 217, 207, 223, 226, 230, 232, 709/235, 241, 242
See application file for complete search history.

(56) References Cited

U.S. PATENT DOCUMENTS 4,553,261 A 11/1985 Froessl
4,636,858 A 1/1987 Hague (Continued)

FOREIGN PATENT DOCUMENTS

EP 0 568 161 A1 1/1992

(Continued)

OTHER PUBLICATIONS

Communication relating to the results of the Partial International Search Report for PCT Application No. PCT/US01/18013 dated Apr. 15, 2002.

(Continued)

*Primary Examiner*—Paul H. Kang
(74) *Attorney, Agent, or Firm*—Brinks Hofer Gilson & Lione

(57) ABSTRACT

A system and method for storing and retrieving location information across a network is disclosed. The system and method utilize a transfer protocol configured to transport an identifier/location relationship to allow one or more locations to be associated with an identifier in the location store of a location server, where the identifier represents a unique entity and the location represents a location of data pertaining to the identifier. The location server contains programming logic operative to provide responses to location queries and capable of scaling a plurality of location servers according to system performance and logistical requirements.

31 Claims, 17 Drawing Sheets

U.S. PATENT DOCUMENTS

| | | | |
|---|---|---|---|
| 4,728,978 A | 3/1988 | Inoue et al. | |
| 4,800,488 A | 1/1989 | Agrawal et al. | |
| 4,825,406 A | 4/1989 | Bean et al. | |
| 4,835,372 A | 5/1989 | Gombrich et al. | |
| 4,914,571 A | 4/1990 | Baratz et al. | |
| 5,008,700 A | 4/1991 | Okamoto | |
| 5,124,814 A | 6/1992 | Takahashi et al. | |
| 5,193,185 A | 3/1993 | Lanter | |
| 5,208,623 A | 5/1993 | Takahashi | |
| 5,291,399 A | 3/1994 | Chaco | |
| 5,319,401 A | 6/1994 | Hicks | |
| 5,347,600 A | 9/1994 | Barnsley | |
| 5,384,643 A | 1/1995 | Inga et al. | |
| 5,414,841 A | 5/1995 | Bingham et al. | |
| 5,455,648 A | 10/1995 | Kazami | |
| 5,475,817 A | 12/1995 | Waldo et al. | |
| 5,479,654 A | 12/1995 | Squibb | |
| 5,499,113 A | 3/1996 | Tsuboi | |
| 5,522,077 A | 5/1996 | Cuthbert et al. | |
| 5,537,547 A | 7/1996 | Chan et al. | |
| 5,550,981 A | 8/1996 | Bauer et al. | |
| 5,551,027 A | 8/1996 | Choy et al. | |
| 5,557,790 A | 9/1996 | Bingham et al. | |
| 5,560,005 A | 9/1996 | Hoover et al. | |
| 5,576,952 A | 11/1996 | Stutman et al. | |
| 5,579,067 A | 11/1996 | Wakabayashi | |
| 5,610,653 A | 3/1997 | Abecassis | |
| 5,617,570 A | 4/1997 | Russell et al. | |
| 5,625,841 A | 4/1997 | Dawkins et al. | |
| 5,649,247 A | 7/1997 | Itoh et al. | |
| 5,664,170 A | 9/1997 | Taylor | |
| 5,669,029 A | 9/1997 | Fyson et al. | |
| 5,724,575 A | 3/1998 | Hoover et al. | |
| 5,740,428 A | 4/1998 | Mortimore et al. | |
| 5,764,889 A | 6/1998 | Ault et al. | |
| 5,764,906 A | 6/1998 | Edelstein et al. | |
| 5,774,670 A | 6/1998 | Montulli | |
| 5,781,725 A | 7/1998 | Saito | |
| 5,784,565 A | 7/1998 | Lewine | |
| 5,802,518 A | 9/1998 | Karaev et al. | |
| 5,809,161 A | 9/1998 | Auty | |
| 5,809,331 A | 9/1998 | Staats et al. | |
| 5,809,495 A | 9/1998 | Loaiza | |
| 5,813,006 A | 9/1998 | Polnerow et al. | |
| 5,848,246 A | 12/1998 | Gish | |
| 5,864,482 A | 1/1999 | Hazama | |
| 5,872,973 A | 2/1999 | Mitchell et al. | |
| 5,875,302 A | 2/1999 | Obhan | |
| 5,903,889 A | 5/1999 | de la Huerga et al. | |
| 5,907,837 A | 5/1999 | Ferrel et al. | |
| 5,913,210 A | 6/1999 | Call | |
| 5,915,240 A | 6/1999 | Karpf | |
| 5,918,214 A | 6/1999 | Perkowski | |
| 5,920,702 A | 7/1999 | Bleidt et al. | |
| 5,940,844 A | 8/1999 | Cahill et al. | |
| 5,950,173 A | 9/1999 | Perkowski | |
| 5,961,610 A | 10/1999 | Kelly et al. | |
| 5,966,705 A | 10/1999 | Koneru et al. | |
| 5,974,124 A | 10/1999 | Schlueter, Jr. et al. | |
| 5,974,409 A | 10/1999 | Sanu et al. | |
| 5,978,773 A | 11/1999 | Hudetz et al. | |
| 5,987,519 A | 11/1999 | Peifer et al. | |
| 5,995,965 A | 11/1999 | Experton | |
| 6,032,175 A | 2/2000 | Fletcher et al. | |
| 6,047,332 A | 4/2000 | Viswanathan et al. | |
| 6,055,544 A | 4/2000 | DeRose et al. | |
| 6,058,193 A | 5/2000 | Cordery et al. | |
| 6,092,189 A | 7/2000 | Fisher et al. | |
| 6,108,787 A | 8/2000 | Anderson et al. | |
| 6,131,095 A | 10/2000 | Low et al. | |
| 6,154,738 A | 11/2000 | Call | |
| 6,188,766 B1 | 2/2001 | Kocher | |
| 6,201,931 B1 | 3/2001 | Cipolla et al. | |
| 6,202,070 B1 | 3/2001 | Nguyen et al. | |
| 6,209,095 B1 | 3/2001 | Anderson et al. | |
| 6,212,280 B1 | 4/2001 | Howard, Jr. et al. | |
| 6,377,986 B1 | 4/2002 | Philyaw et al. | |
| 6,418,441 B1 | 7/2002 | Call | |
| 6,438,652 B1 * | 8/2002 | Jordan et al. | 711/120 |
| 6,463,454 B1 * | 10/2002 | Lumelsky et al. | 718/105 |
| 6,466,980 B1 * | 10/2002 | Lumelsky et al. | 709/226 |
| 6,578,068 B1 * | 6/2003 | Bowman-Amuah | 709/203 |
| 6,711,408 B1 * | 3/2004 | Raith | 455/440 |
| 2002/0112048 A1 | 8/2002 | Gruyer et al. | |

FOREIGN PATENT DOCUMENTS

| | | |
|---|---|---|
| EP | 0 889 422 A2 | 1/1999 |
| EP | 0 919 912 A2 | 6/1999 |
| WO | WO 86/05610 | 9/1986 |
| WO | WO 98/15910 | 4/1998 |
| WO | WO 98/00624 | 7/1998 |
| WO | WO 98/31138 | 7/1998 |
| WO | WO 00/03526 | 1/2000 |

OTHER PUBLICATIONS

Bourke D G et al: "Programmable Module and Circuit for Machine-Readable Unique Serial Number" IBM Technical Disclosure Bulletin, vol. 27, No. 4A, Sep. 1, 1984 pp. 1942-1944.

Kleinholz L et al: "Supporting Cooperative Medicine: The Bermed Project" IEEE Multimedia, vol. 1, No. 4, Dec. 21, 1994 pp. 44-53.

"Method for Network Naming and Routing" IBM Technical Disclosure Bulletin, vol. 37, No. 9, Sep. 1, 1994 p. 255.

"Minimizing Locking To Access Global Shared Data", IBM Technical Disclosure Bulletin, pp. 619-622, Feb. 1995.

"A robust software barcode reader using the Hough transform", Muniz, R., Junco, L.; Otero, A., Abstract, 1999 Int'l Conf. On Information Intelligence and Systems (Oct. 31 to Nov. 3, 1999).

"In-Fab identification of silicon wafers with clean, laser marked barcodes", Fresonke, D., Abstract, 1994 IEEE/Semi Advanced Semiconductor Manufacturing Conference and Workshop (Nov. 14 to Nov. 16, 1994).

"Applications of barcode technology in automated storage and retrieval systems", Sriram, T.; Vishwanatha Rao, K.; Biswas, S.; Ahmed, Abstract, Proceedings of the 1996 IEEE IECON 22nd Int'l Conf. On Industrial Electrodes (Aug. 5 to Aug. 10, 1996).

Claims for U.S. Appl. No. 09/111,896, filed Jul. 8, 1998 entitled System And Method For Establishing And Retrieving Data Based On Global Indices.

Claims for U.S. Appl. No. 09/503,441, filed Feb. 14, 2000 entitled Automated Image Archiving System.

Claims for U.S. Appl. No. 09/367,461, filed Aug. 13, 1999 entitled Automated Image Archiving System.

Callaghan V L et al., "Structures and Metrics for Image Storage and Interchange" Journal of Electronic Imaging, vol. 2, No. 2, Apr. 1, 1993, pp. 126-137.

"Method for Network Naming and Routing" IBM Technical Disclosure Bulletin, vol. 37, No. 9, Sep. 1, 1994, p. 255.

"Service Location in an Open Distributed Environment," Beitz et al., Second International Workshop on Services in Distributed and Networked Environments, IEEE Comput. Soc., Jun. 1995, pp. 28-34.

Baer, Tony, "Tales from the Network", Computerworld Healthcare Journal, www.computerworld.com/news/1996/story/0,11280,14557,00.html, pp. 1-9, Oct. 1, 1996.

* cited by examiner

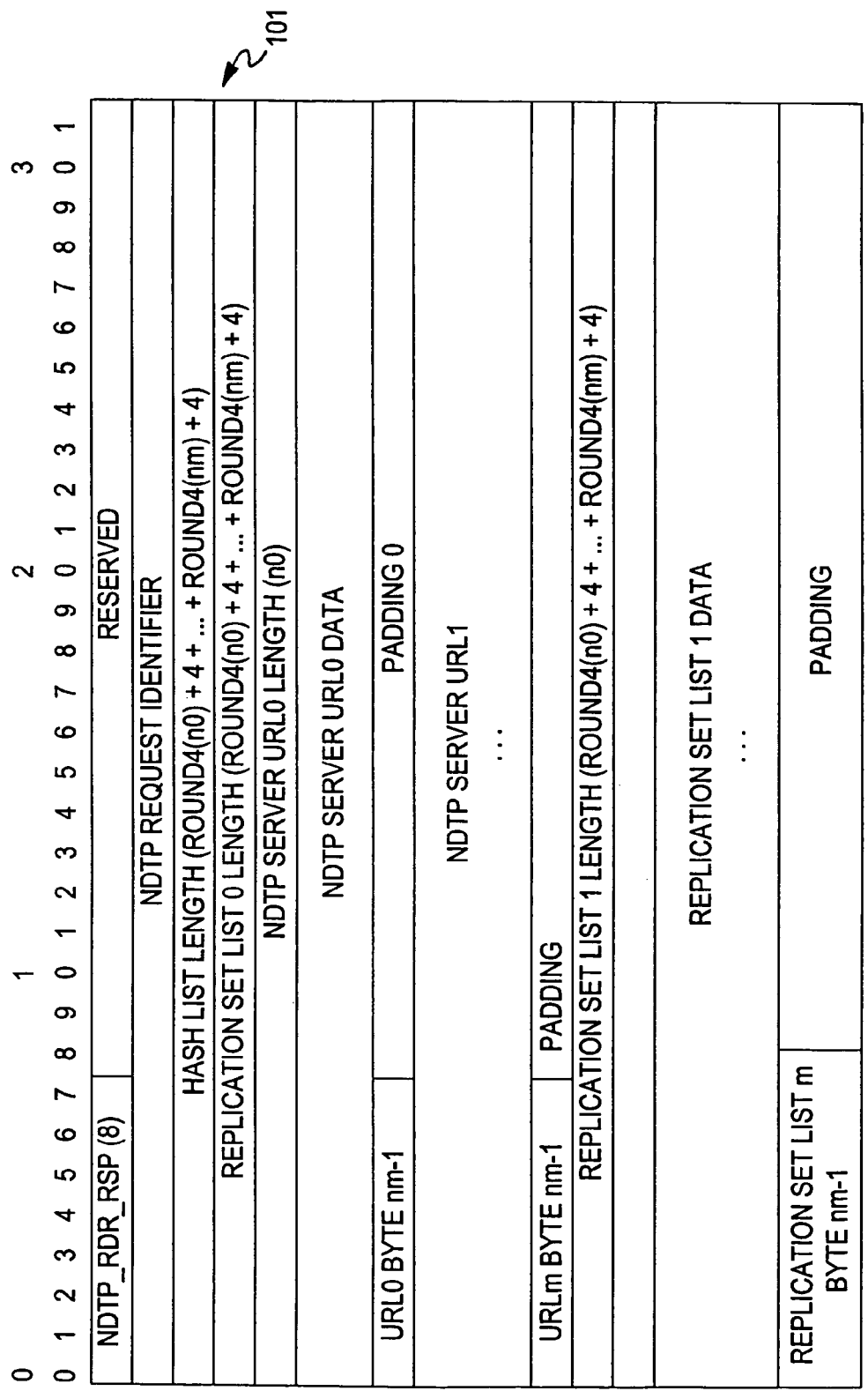

| IDENTIFIER | LOCATION |
|---|---|
| ALICE | PDA: 1, CELL: 1, COMPUTER: 0 |
| BILL | CELL: 0, PDA: 1 |
| ⋮ | ⋮ |

METHOD AND APPARATUS FOR MANAGING LOCATION INFORMATION IN A NETWORK SEPARATE FROM THE DATA TO WHICH THE LOCATION INFORMATION PERTAINS

RELATED APPLICATIONS

This application claims the benefit of provisional patent application Ser. No. 60/209,070 filed Jun. 2, 2000 and provisional application Ser. No. 60/277,408 filed Mar. 19, 2001; and this application is a continuation-in-part of each of the following non-provisional U.S. patent applications: application Ser. No. 09/661,222 entitled NETWORK DISTRIBUTED TRACKING WIRE TRANSFER PROTOCOL, filed on Sep. 13, 2000 now U.S. Pat. No. 7,103,640; application Ser. No. 09/503,441 entitled AUTOMATED SYSTEM FOR IMAGE ARCHIVING, filed Feb. 14, 2000 now abandoned; application Ser. No. 09/367,461 entitled AUTOMATED SYSTEM FOR IMAGING ARCHIVING, filed Aug. 13, 1999 now abandoned; and application Ser. No. 09/111,896 entitled SYSTEM AND METHOD FOR ESTABLISHING AND RETRIEVING DATA BASED ON GLOBAL INDICES, filed on Jul. 8,1998 now abandoned, wherein the entirety of each of these provisional and non-provisional applications is incorporated herein by reference.

FIELD OF THE INVENTION

This invention relates generally to the storage and retrieval of information, and in particular, to a system and method for managing global search and retrieval of information across a network.

BACKGROUND

Data records can reside in many different places. In existing retrieval systems and methods, a client seeking information sends a request to a server. Typically, only files that are registered with that server are returned. Disadvantageously, the search is also usually restricted to a local, identified system. The search is thus conducted only where the server knows in advance to look.

Another disadvantage of known retrieval systems is the difficulty in accessing data in different forms. Current retrieval systems are typically designed to search for data in limited forms. One example is where a client requests files based on a subject, like a person's name. Search results for this type of search may only retrieve text files of peoples' names. Another problem in current retrieval systems is that the client may receive text and image files in the search results, but cannot seamlessly access the image files. Yet another problem in current retrieval systems is that video and sound files related to the request may not even be found in the search results. For example, a doctor might be able to retrieve medical records on a specific patient, but cannot view MRI or X-Ray results associated with that record.

A distributed database is one where data is stored and retrieved among multiple machines connected by a network. Typically, each machine in which some portion of the data in a distributed database may reside is called an application server. One commonly asked question in an application server environment is: Where is data associated with a particular entity in a distributed database? The data location is a key question when a distributed database has highly dynamic, and even spontaneous, data distribution properties.

In networked environments where there are a large number of data repositories and any particular entity does not have data in all of the data repositories, a mechanism is needed that would permit queries to be directed only at data repositories with relevant information. It would also be beneficial to permit membership in the set of data repositories itself to be highly dynamic. Such a system would support on-the-fly addition and removal of data repositories from the topology of a distributed database seamlessly and without the need to reprogram the database.

Another challenge faced in networked environments is scaling system capabilities in a manner sufficient to handle variable demand for resources. A system and method for scaling resources to accommodate demands for those resources is also desirable.

BRIEF SUMMARY

In view of the above, the invention provides a system and method for managing data, using a transfer protocol, in a network environment. According to one aspect of the invention, a system for managing location information and providing location information to data location queries comprises a transfer protocol configured to manipulate an identifier, and at least one location associated with the identifier, wherein the identifier uniquely specifies an entity and wherein each data location specifies a location of data in a network pertaining to the entity. The system also includes a location server containing location information corresponding to at least one entity that is formatted according to the transfer protocol, where the location of data relates to an application server in the network. The system further includes programming logic stored on the location server that is responsive to a location query identifying a desired entity to return a location message. The location message includes one or more locations associated with the desired entity.

According to another aspect of the invention, a method of handling location queries in a network having a plurality of location servers containing location information correlating each of a plurality of unique identifiers with at least one location is disclosed. The method includes receiving a location query from a client requesting the location of data relevant to an entity identified in the query. The queried location server sends a location response message to the client if the queried location server contains information relevant to the entity identified in the query. The location server sends a redirect message to the client if it does not contain location information relevant to the entity identified in the query, where the redirect message comprising a list of location servers containing information relevant to the entity identified in the query.

In another aspect of the invention, a method of scaling at least one of location server capacity and transaction rate capability in a system for storing and retrieving location information over a network using a transfer protocol is disclosed. The method includes providing a transfer protocol configured to transport and manipulate an identifier and a location, the location specifying the location of data in the network corresponding to the identifier, and providing a first location server storing location information formatted according to the transfer protocol. Upon receipt of an identifier and location from a first client, where the location represents a location of an application server in the network containing data stored by the first client related to an entity represented by the identifier, the location is stored in a location store at the first location server. A portion of the identifiers and respective location associations in the first location server are transferred to a second location server when a performance criterion of the first location server reaches a predetermined performance limit.

According to another aspect of the invention a database is disclosed. The database includes a computer readable medium containing a plurality of index designations, where each index designation represents of one of a plurality of identifiers, and where each identifier uniquely identifies an entity. The database also contains a plurality of locations, where each of the locations is associated with at least one of the plurality of index designations and represents a location of information relevant to an identifier represented by an index designation. A location store having a table containing the plurality of index designations and associated locations is stored in the computer readable medium, as well as an indexing function operative to map each of the plurality of identifiers to a respective one of the plurality of index designations.

These and other features and advantages of the invention will become apparent upon a review of the following detailed description of the presently preferred embodiments of the invention, when viewed in conjunction with the appended drawings.

BRIEF DESCRIPTION OF THE DRAWINGS

FIG. 17 is a layout of one presently preferred NDTP_RDR_RSP message, where FIG. 17(a) shows a server table layout.

DETAILED DESCRIPTION OF THE PRESENTLY PREFERRED EMBODIMENTS

The following terms are used to describe the operation of the presently preferred distributed database system. A network distributed tracking protocol (NDTP) is a transfer protocol having the capability to manipulate location information used to efficiently track the location of information associated with an individual entity in the distributed database system. An "entity identifier" or an "identifier" is a unique encoding, which may be a string in one embodiment, with which zero or more data location specifiers are associated in an NDTP server. A "data location" or "location" is an encoding, for example a string, that is a member of a set of associations with an identifier in an NDTP server. An "NDTP client" or a "client" is a network-attached component that initiates add, delete, lookup and update of identifier/location mappings, or associations, from an NDTP server with NDTP request messages. An "NDTP server" or a "server" is a network-attached component that maintains a set of identifier/location mappings that are modified or returned in response to NDTP request messages from clients. The term "Network Byte Order" is the ordering of bytes that compose an integer of larger than a single byte as defined in the Internet Protocol (IP) suite. Preferably, Network Byte Order specifies a big-endian, or most significant byte first, representation of multibyte integers. In this specification a byte is preferably composed of eight bits.

Figure 1:
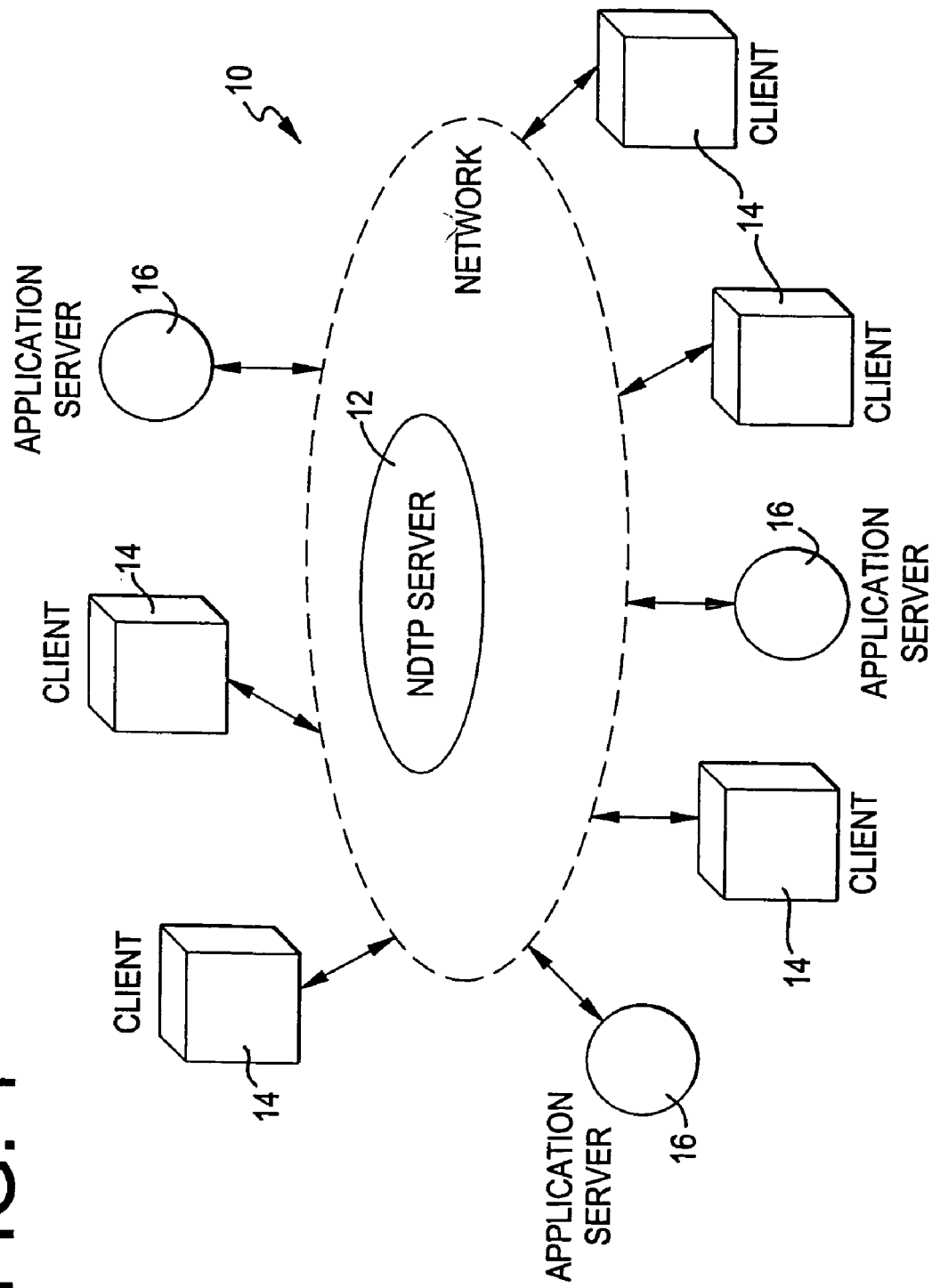
FIG. 1 is a system block diagram according to a preferred embodiment.

FIG. 1 shows one basic topology of a preferred network 10 implementing a preferred embodiment of the distributed database system. The distributed database system 10 includes at least one NDTP server 12, at least one client 14, and, in one embodiment, an application server 16. An application server 16 is deployed for given purposes, such as a distributed database, instant messaging, phone routing, distributed content management, geo-location services and etc. As will be explained in greater detail below, the distributed database system preferably allows clients 14 to efficiently locate information through queries to the NDTP servers 12. Using the NDTP protocol, the NDTP servers maintain location information in the form of a list of location associations with an entity. The location may be address information for the application server(s) containing information relevant to the identifier or address information for the application server(s) through which data relevant to the identifier may be accessed. In one embodiment, when a client queries the NDTP server for information pertaining to an entity, the NDTP server preferably returns a list of all locations for the specified entity. The client then can directly access the various locations, relieving the NDTP server of any further involvement in the transaction and allowing the NDTP server to handle more queries.

Alternatively, the location may also be one or more pieces of data identifying the physical location of the entity identified by the identifier. In embodiments where the location on the NDTP server is a physical location of the entity identified by the identifier (e.g. a geo-location service), no application servers 16 may be necessary because the location information on the NDTP server(s) may be the endpoint of the client query.

Figure 2:
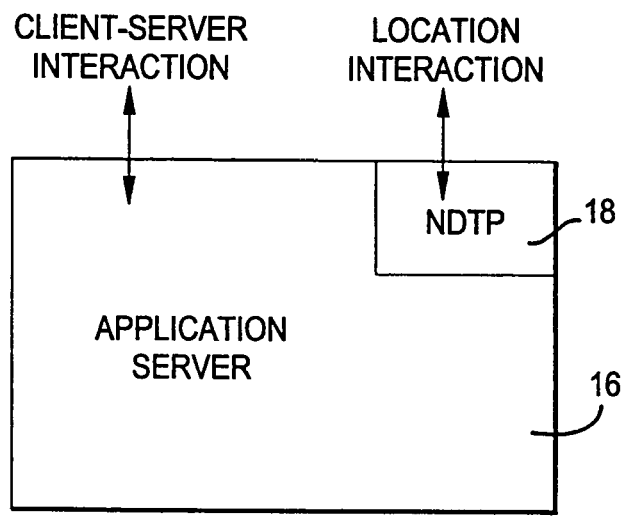
FIG. 2 is a block diagram of a location suitable for use in the system of FIG. 1.

When the locations returned by an NDTP server to a client are of address information of one or more application servers, these application servers 16 may be any type of mechanism accessible by a client system. As shown in FIG. 2, a location, such as an application server 16 containing a location-enabled service or router table, may include an NDTP application 18 for receiving and reporting NDTP references. The application server 16 running the location-enabled service or router table preferably supports the client-server interactions. Any of a number of existing location-enabled services, such as Universal Resource Identifier (URI)—Universal Resource Locator (URL) mappings in distributed content management, or router table formats may be operated on the application server 16.

Figure 3:
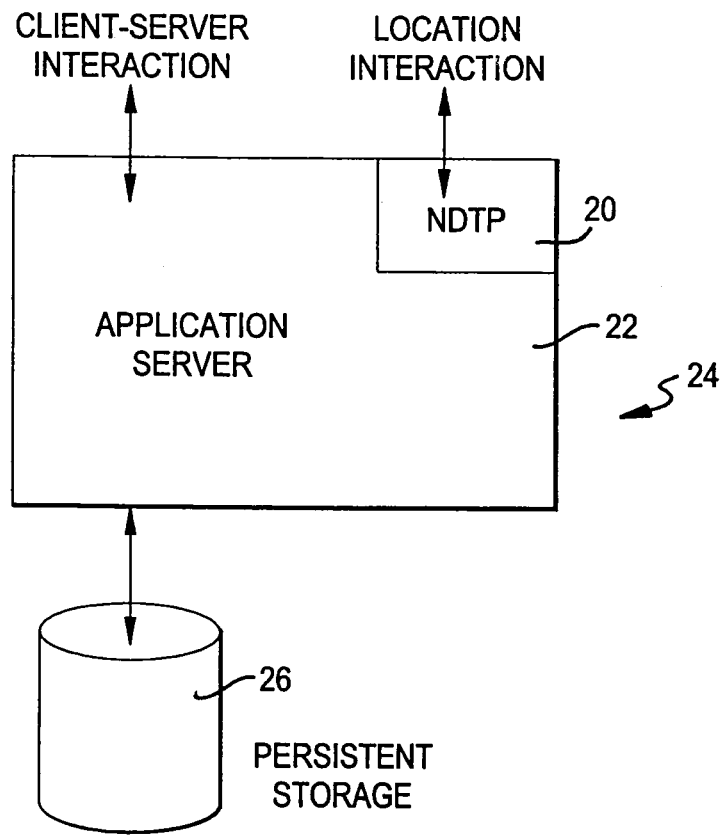
FIG. 3 is a block diagram of an alternative embodiment of the location of FIG. 2.

FIG. 3 illustrates an embodiment where the location is a data repository 24 composed of an application server 22 and an NDTP application 20 associated with a persistent storage mechanism 26 such as a disk drive, for managing client-server interaction. In an alternative embodiment, the location in FIG. 2 may consist of a routing table on the application server 16. In this alternative embodiment, the NDTP application 18 performs location interactions and the routing table routes services to appropriate destinations. Similarly, the client 14 may be any mechanism capable of communicating with the NDTP server. For example, a client 14 may consist of a PC-based computer, computer network, personal digital assistant (PDA), telephone, car messaging center, and so on.

The NDTP server 12 illustrated in FIG. 1 is preferably a network server configured to answer the question: Where is data associated with a particular entity in a distributed database system? This is in contrast to the question of what is the data associated with a particular entity in the distributed database system that must be answered by a typical distributed database mechanism. The NDTP server is built upon a location store data structure. Large databases store large amounts of data, but the NDTP server is only concerned with the location of that data, rather than the endpoint referent data itself.

Figure 4:
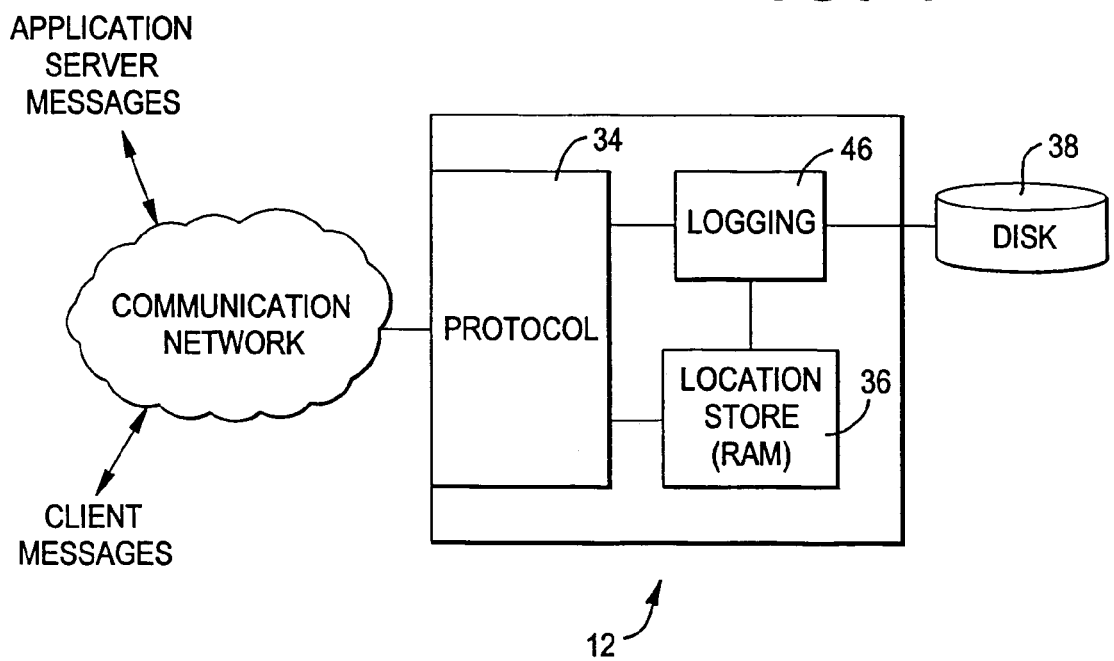
FIG. 4 is a block diagram of an NDTP server suitable for use in the system of FIG. 1.

Referring to FIG. 4, the NDTP server 12 includes a network front end 34, RAM storage 36, and non-volatile storage 38. The non-volatile storage 38 may be a disk drive that is in communication with, or integral with, the NDTP server hardware. The network front end 34 includes a memory manager that is preferably logic operative to divide a large contiguous memory area into small, fixed sized chunks, for example 128 octets. These fixed sized chunks are used to build both strings, with linked lists of chunks used to represent strings that do not fit within a single chunk, and mapping lists, with linked lists of chunks to represent mapping lists that have more elements than fit in a single chunk. The network front end also includes a transaction protocol, such as transaction control protocol/Internet protocol (TCP/IP). The NDTP server 12 preferably maintains the state of its mappings in the non-volatile storage 38. An indexed location store is maintained in RAM 36 that contains a table of index designations, where the identifiers are mapped to one or more locations in the location store. The indexed location store may be indexed by a table implemented through an efficient function, such as hash function, b-tree function or t-tree function. Additionally, an NDTP server map identifying any other NDTP server locations for the specific network and the set of associations contained in each respective NDTP server is maintained in RAM, persistent storage, or preferably both RAM and persistent storage.

In one embodiment, a NDTP server 12 will read the state of its mapping sets from disk storage to service requests from clients, and once it starts servicing requests, the only action it will perform to disk storage is to record each NDTP update transaction as it is processed. In other embodiments, the state of the NDTP server mapping sets may be maintained in RAM. In yet other embodiments, the server mapping sets are maintained in RAM and persistent storage. The records written to the NDTP server log file refer to associations in the NDTP server location store using a pointer that defines a reference to an existing location. In one embodiment, the record looks like:

```
typedef struct ss_log_map {
    ss_i_t op;          /* opcode, LOG_MAP */
    ss_i_t rec;         /* rec pointer (previously allocated chunk */
    ss_i_t to;          /* to pointer (string) */
} ss_log_map_t;
```

The ss_i_t type is the natural unsigned integer for the platform on which the NDTP server is being run. For example, it is a 32-bit integer on Intel (IA32) platforms, and a 64-bit integer on UltraSPARC platforms.

If the NDTP_PUT results in extending the linked list of mapping pointers with a new memory chunk, the record is somewhat different:

```
typedef struct ss_log_new_map {
    ss_i_t op;          /* opcode, LOG_NEW_MAP */
    ss_i_t from;        /* from pointer (in string or rec) */
    ss_i_t rec;         /* rec pointer (new rec) */
    ss_i_t to;          /* to pointer (string) */
} ss_log_new_map_t;
```

The log record for an NDTP_DEL update is similar to the one for an NDTP_PUT;

```
typedef struct ss_log_unmap {
    ss_i_t op;
    ss_i_t from;        /* from pointer (key cstr) */
    ss_i_t to;          /* to pointer (data cstr) */
} ss_log_unmap_t;
```

Each time a new location is created in the NDTP server location store, a new string log file entry is written into the log file:

```
typedef struct ss_log_string {
    ss_i_t op;          /* opcode, LOG_STRING */
    ss_i_t len;
    ss_i_t chunks[ ];
    ss_log_str_t s;
} ss_log_string_t;
``` where the ss_log_str type is similar to the ndtp_str_t, except that the len field is an ss_i_t instead of a uint32_t:

```
typedef struct ss_log_str_t {
    ss_i_t len;
    uint8_t data[ ];
} ndtp_str_t;
```

The transactional nature of NDTP protocol means that the response to an update request is not returned until request has completed, including being committed to nonvolatile storage. The NDTP server 12 combines the log file writes of multiple NDTP update transactions by adding each log file record to a log file write buffer 46 until either the buffer becomes full, or the network front end requests that one or all log file write buffers 46 be flushed to disk. The NDTP server 12 preferably maintains more than one log file buffer so that its performance at high transaction rates becomes insensitive to the high latency of individual file write operations. To prevent unbounded log file growth, the NDTP server will periodically write its entire current state to a new log file, close the old log file, and then begin the update logging process in the new log file.

Implementing the NDTP protocol specified below, if there are a large number of data repositories and other types of application servers in a network and any particular entity does not have data in all of them, the NDTP server permits queries to be directed only at pertinent data repositories and application servers. The NDTP server also preferably permits membership in the set of repositories and application servers itself to be highly dynamic and even spontaneous. The NDTP server supports on-the-fly addition and removal of data repositories and application servers from its deployed topology.

Figure 5:
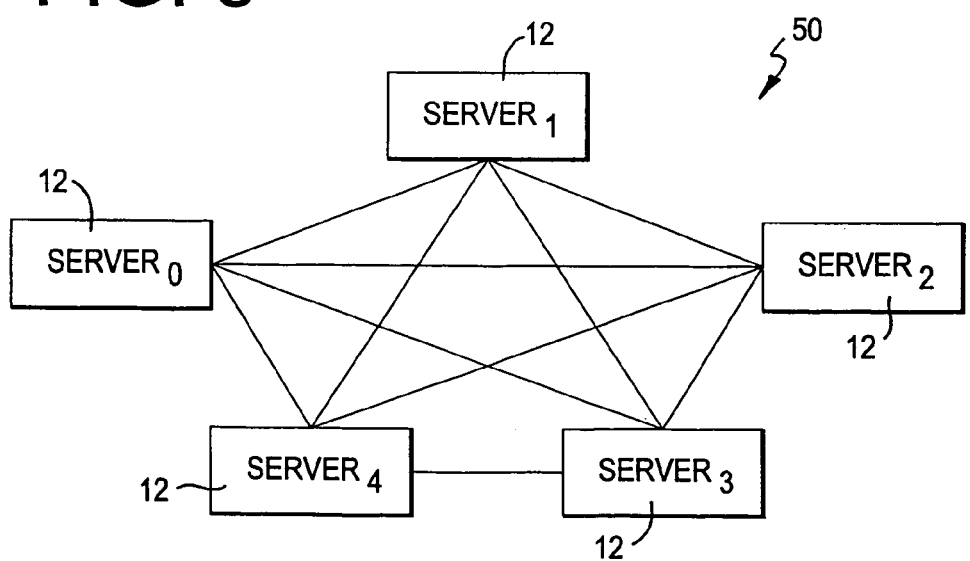
FIG. 5 is a block diagram of an NDTP server topology according to a preferred embodiment.
Figure 6:
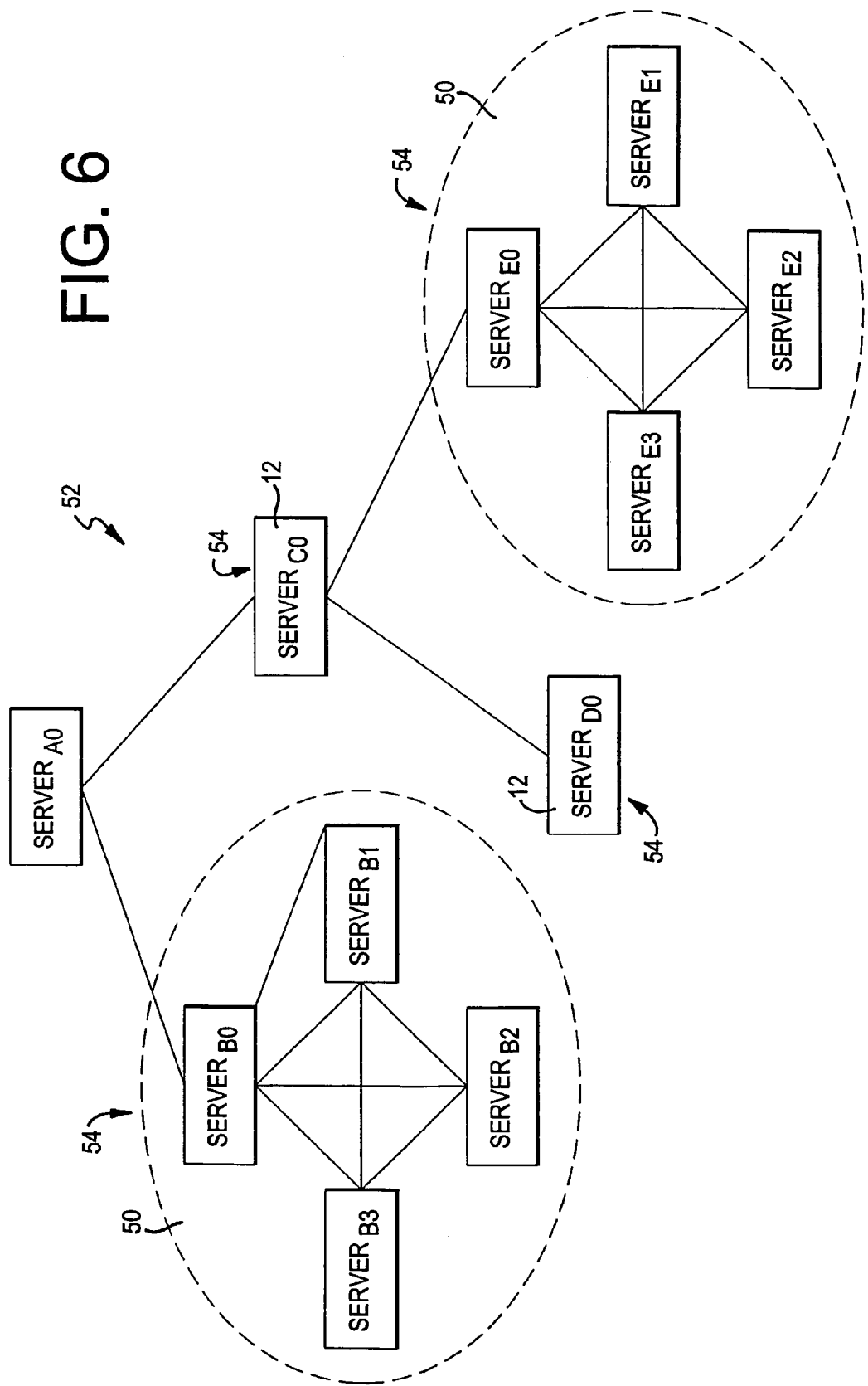
FIG. 6 is a block diagram of an alternative NDTP server topology.

The NDTP server 12 may be implemented on any of a number of standard computer platforms including, for example, PC-based platforms having 64 Megabytes of RAM, and a PENTIUM-type processor operating at 450 MHz on a 100 Mbit Ethernet connection. Additionally, as illustrated in FIGS. 5 and 6, the NDTP server may be a network of NDTP servers configured in any number of ways. For example, FIG. 5 illustrates a flat NDTP server topology using clustering, or a distributed topology using replication, where each of the NDTP servers 12 in the cluster may contain a different portion of a pool of associated identifier and location information. In another alternative embodiment, a hierarchical NDTP server topology, such as the NDTP server tree 52 shown in FIG. 6, may be utilized. In the NDTP server tree 52 topology, each node 54 may be an individual NDTP server 12, a cluster 50 of NDTP servers, an NDTP server tree or any combination of these arrangements.

Network Distributed Tracking Protocol (NDTP)

The Network Distributed Tracking Protocol (NDTP) efficiently tracks the location of data associated with an individual entity in a distributed database. NDTP is a transactional protocol, which means that each operation within NDTP consists of a request message from an NDTP client to an NDTP server, followed by an appropriate response message from the NDTP server to the NDTP client.

The NDTP server treats the identifier as an unstructured stream of octets, which is assumed to be unique to a particular entity. The precise structure of the NDTP identifier and the mechanism for ensuring its uniqueness are a function of the application in which the NDTP server is used. In a customer oriented application, the NDTP identifier might be a unique customer identifier, for example, a Social Security Number, in either printable or binary integer form, as is appropriate to the application. NDTP also defines a location to specify an association with a particular identifier. Multiple connections of locations with identifiers may be used concurrently.

As with identifiers, the NDTP server treats locations as unstructured streams of octets. The structure of a location is a function of the application in which the NDTP server is used. For example, a location might be an Internet machine name, and a TCP/IP port number for a relational database server, or an HTTP Universal Resource Locator (URL), or some concatenation of multiple components.

The NDTP server efficiently maintains and dispenses one to many relationships between identifiers and locations. In other words, an identifier may be associated with any number of locations. In embodiments where the location information relates to locations of application servers containing data or routing information for finding data, the NDTP server is updated to indicate an association between the identifier and the application server's location when data for a particular identifier is added to an application server. When a query is performed for an identifier, the NDTP server supplies the set of application servers in which data may be found for that identifier.

General NDTP Mechanics

The protocol of the invention is designed to provide maximum transaction throughput from both the NDTP server and associated clients. The design goal is realized through two design principles:
1. NDTP messages should preferably be as short as possible to maximize the rate of NDTP transactions for a given network communication bandwidth.
2. NDTP messages should preferably be structured for efficient processing on existing machine architectures.

Design Optimizations.

In keeping with other network protocol standards including TCP/IP, multioctet integer quantities in NDTP are preferably encoded using the big endian integer interpretation convention, as set forth above. In one embodiment, NDTP fields are preferably represented in binary format and aligned on 32-bit boundaries.

To overcome network latency, NDTP is designed to support asynchronous operation, where many requests may be sent to an NDTP server before a response from any of them is received.

Each NDTP message is preceded by a fixed size, 12-octet header, using the preferred data structure:

```
typedef struct ndtp_hdr {
    uint8_t op;          /* opcode */
    uint8_t pad[3];
    uint32_t id;         /* transaction identifier */
    uint32_t size;       /* total request size
                            following the header */
} ndtp_hdr_t;
``` where:

op:
 NDTP message numerical operation code.

```
NDTP_GET:           get request
NDTP_GET_RSP:       get response
```

-continued

| | |
|---|---|
| NDTP_PUT: | put request |
| NDTP_PUT_RSP: | put response |
| NDTP_DEL: | delete request |
| NDTP_DEL_RSP: | delete response |
| NDTP_RDR_RSP: | request redirection |
| NDTP_UPD: | update |
| NDTP_UPD_RSP: | update response | id:
   Client supplied operation request used to distinguish responses from multiple outstanding NDTP asynchronous requests. Each "_RSP" message echoes the id field of the associated request.

size:
   Size, in octets of the remainder of the NDTP message. The size field should preferably be a multiple of 4 octets.

Variably sized portions of NDTP messages are preferably defined with a size field rather than some other delimiter mechanism to facilitate efficient reading of NDTP messages.

The variably sized portions of NDTP messages are composed of zero or more NDTP strings:

```
typedef struct ndtp_str {
    uint32_t len;
    uint8_t data[ ];
} ndtp_str_t;
```

Note that the C struct definitions in this document are schematic, and not necessarily fully compliant structures in the C programming language. Specifically, arrays denoted in this document with "[]" imply a dimension which is only known dynamically and this indefinite array size specifier is not allowed in C struct definitions. Note also the following:

len:
   the number of significant octets of data following the len field in the data area.

data:
   len octets of data, followed by up to 3 octets of padding, to ensure that the total length of the NDTP string structure is a multiple of 4 octets.

The padding octets are not included in the len field.

Because variable sized portion NDTP messages are composed of zero or more NDTP strings and NDTP records preferably occupy an even multiple of 4 octets, this ensures that the "size" field of NDTP message headers will preferably be a multiple of 4 octets.

Protocol Structure

Figure 7:
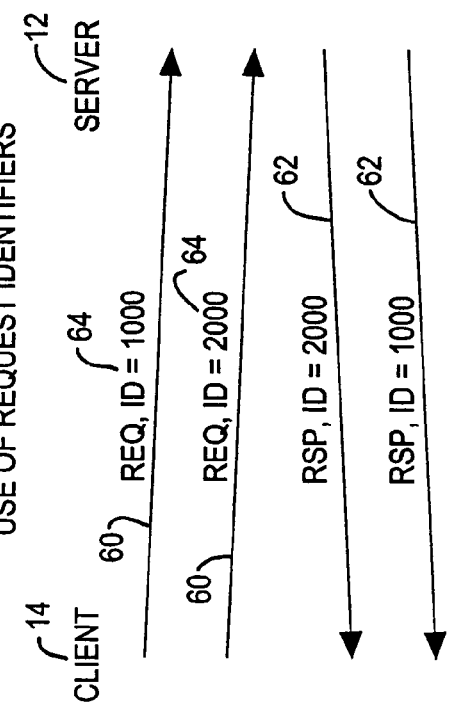
FIG. 7 is an example of multiple outstanding protocol requests.

An example of multiple outstanding NDTP requests and the use of request identifiers is shown in FIG. 7. NDTP preferably has a simple, stateless request response structure. Each request message 60 sent by a client 14 has a corresponding response message 62 returned by the server 12. To maximize server throughput and use of available network bandwidth, NDTP is asynchronous in nature. Many requests 60 from a single client 14 may be outstanding simultaneously, and responses 62 may or may not be returned from the server 12 in the order in which the requests 60 were issued. Each NDTP request 60 contains an NDTP request identifier 64 that is returned in the NDTP response 62 for the associated request 60. An NDTP client 14 uses a unique NDTP request identifier 64 for each NDTP request 60 that is outstanding at the same time to an NDTP server 12 if it wishes to correlate responses with requests.

There are four basic operations preferably supported by the NDTP: add a location association, delete a location association, get location associations, and update a location association or associations. The response to adding a location association is a simple acknowledgement. If the location is already associated with the identifier, adding the association has no effect, but the request 10 is still acknowledged appropriately. In other words, the NDTP add operation is idempotent. The response to deleting a location association is a simple acknowledgement. If the location is not currently associated with the identifier, deleting the association has no effect, but the request 60 is still acknowledged appropriately. In other words, the NDTP delete operation is idempotent. The response to getting one or more locations is a list of one or more locations presently associated with an identifier. If no location associations currently exist, a list of length zero is returned. The response to updating a location association for an identifier is a simple acknowledgement. As the NDTP update operation is functionally a combination of the NDTP add and delete operations, the NDTP update operation is also idempotent.

Message Formats

Figure 8:
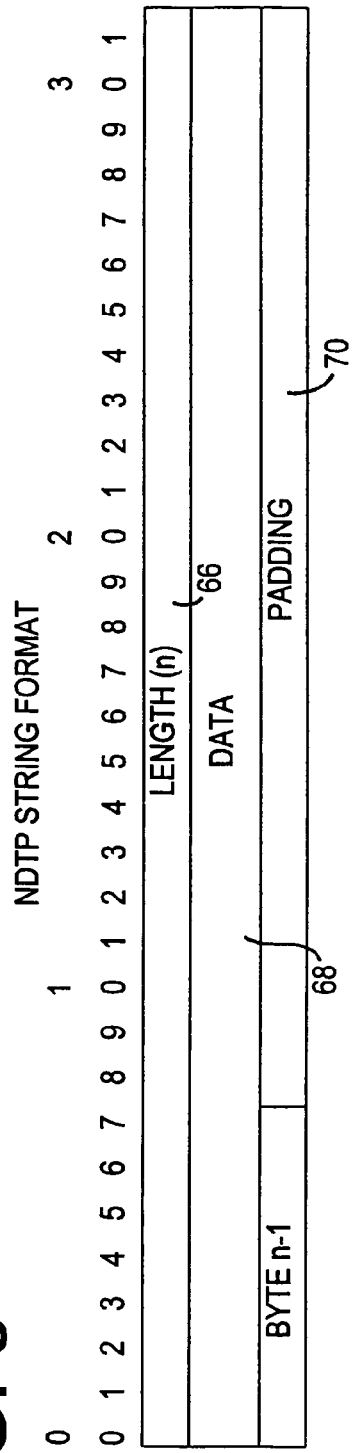
FIG. 8 is a layout of one presently preferred string format.

NDTP messages 60, 62 preferably have a regular structure that consists of a message operation code, followed by a request identifier 64, followed by a length (in bytes) 66 followed by zero or more strings 68 as shown in FIG. 8. As those skilled in the art will appreciate, NDTP message formats are preferably independent of the network transport layer used to carry them. NDTP preferably defines mappings of these messages 60, 62 onto TCP and UDP transport layers (described in detail below), but other mappings could also be defined and it is likely that these NDTP message formats would not require change. For example, the notation ROUND4(X) means X, rounded up to the next multiple of 4.

Integer Format

Multibyte integers in NDTP messages are represented in network byte order; using the big-endian convention. In other words, the most significant byte of a multibyte integer is sent first, followed by the remainder of the bytes, in decreasing significance order.

String Format

Strings in NDTP are represented as counted strings, with a 32-bit length field 66, followed by the string data 68, followed by up to 3 bytes of padding 70 to make the total length of the string representation equal to ROUND4 (length). This layout is shown diagrammatically in FIG. 8.

NDTP_GET Format

Figure 9:
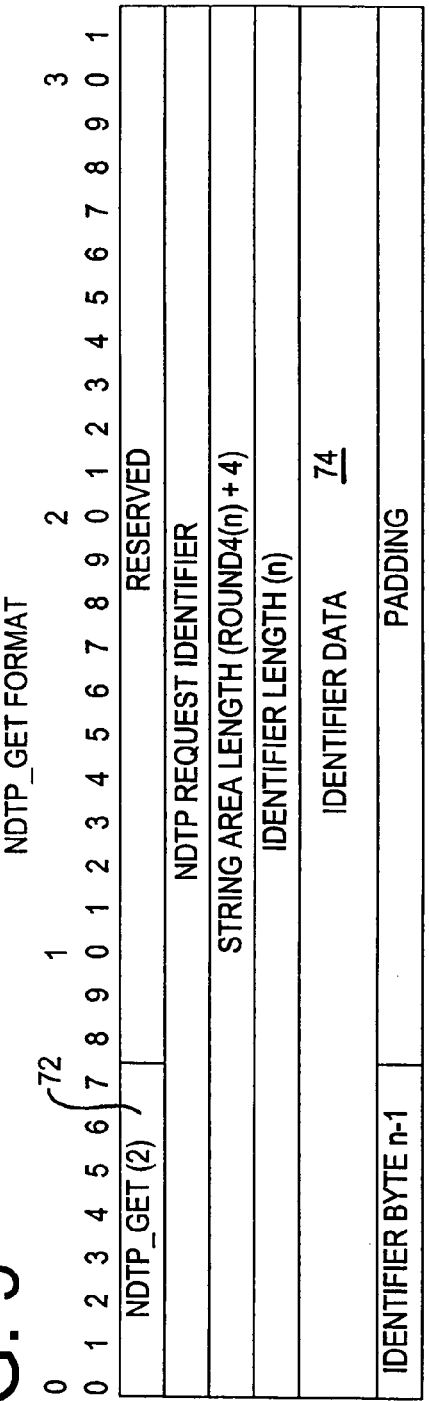
FIG. 9 is a layout of one presently preferred NDTP_GET message.

The NDTP_GET message has a message operation code 72 of 2, and a single NDTP string 74 which is the identifier string for which to get associated locations. This layout is shown diagrammatically in FIG. 9.

NDTP_GET_RSP Format

Figure 10:
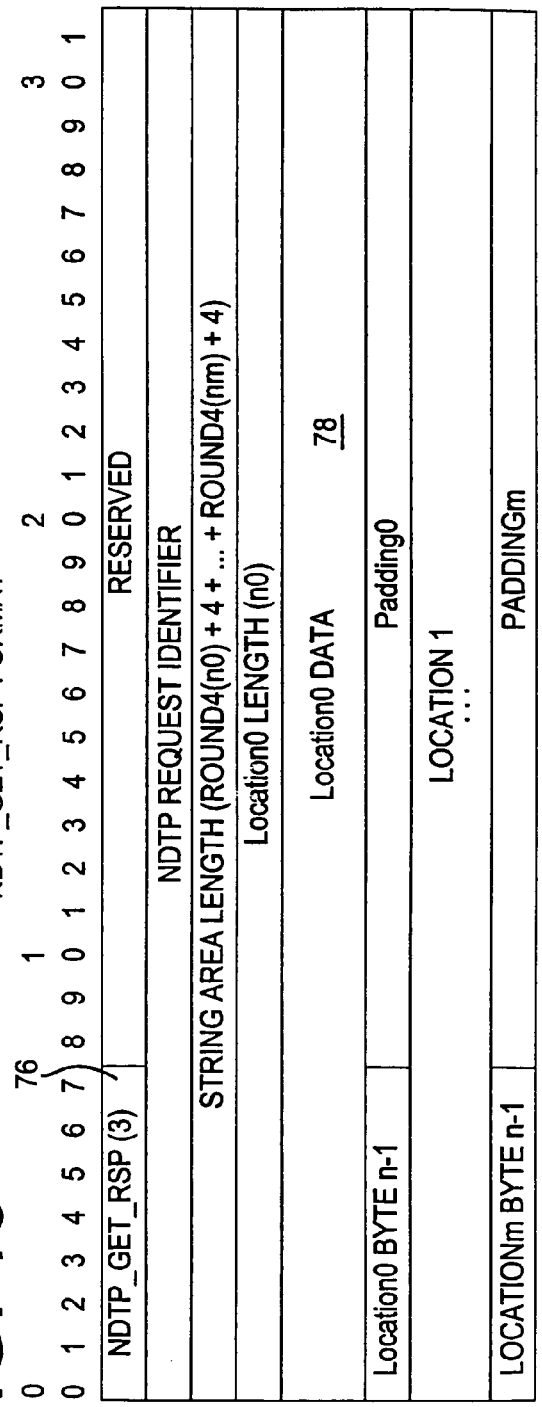
FIG. 10 is a layout of one presently preferred NDTP_GET RSP message.

The NDTP_GET_RSP message has a message operation code 76 of 3, and zero or more strings 78 that are the locations currently associated with the requested identifier. This layout is shown diagrammatically in FIG. 10.

NDTP_PUT Format

Figure 11:
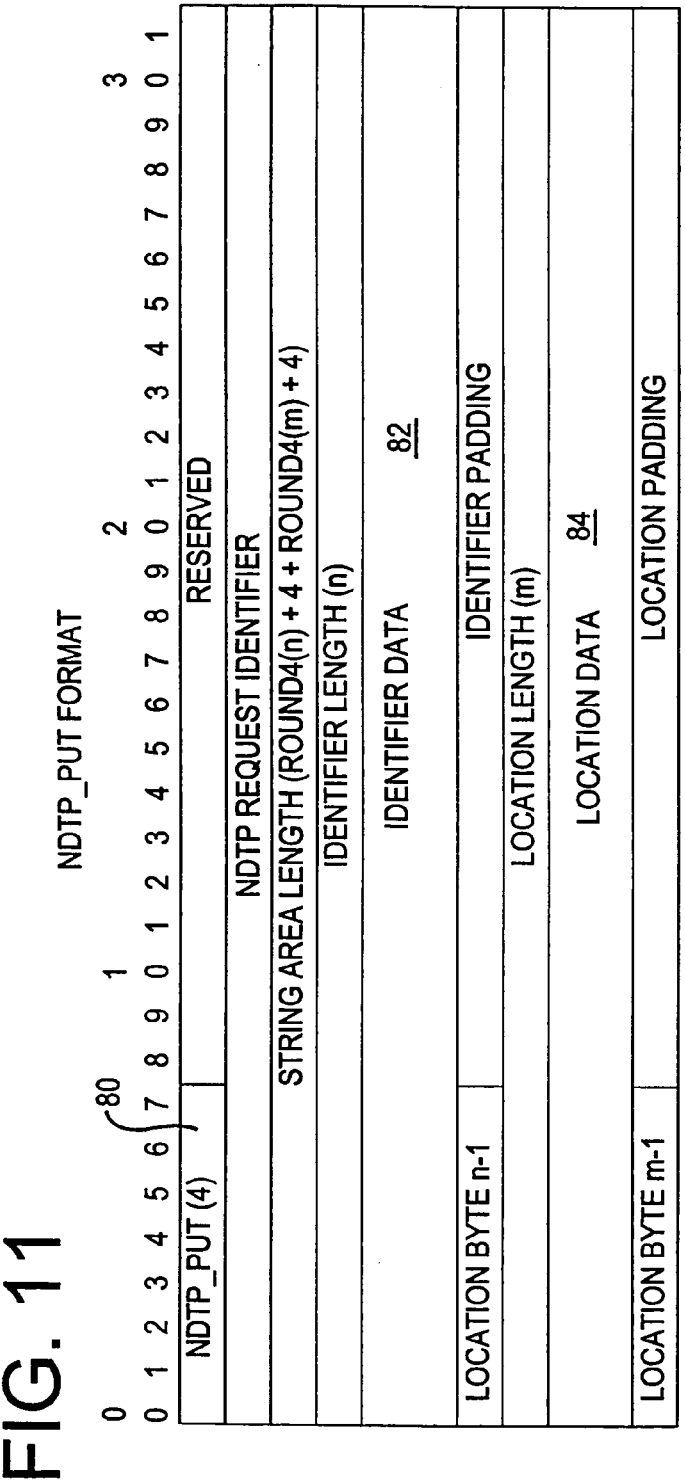
FIG. 11 is a layout of one presently preferred NDTP_PUT message.

The NDTP_PUT message has a message operation code 80 of 4, and two NDTP strings 82, 84. The first string 82 is the identifier for which to add a location association, and the second string 84 is the location to add. This layout is shown diagrammatically in FIG. 11.

NDTP_PUT_RSP Format

Figure 12:
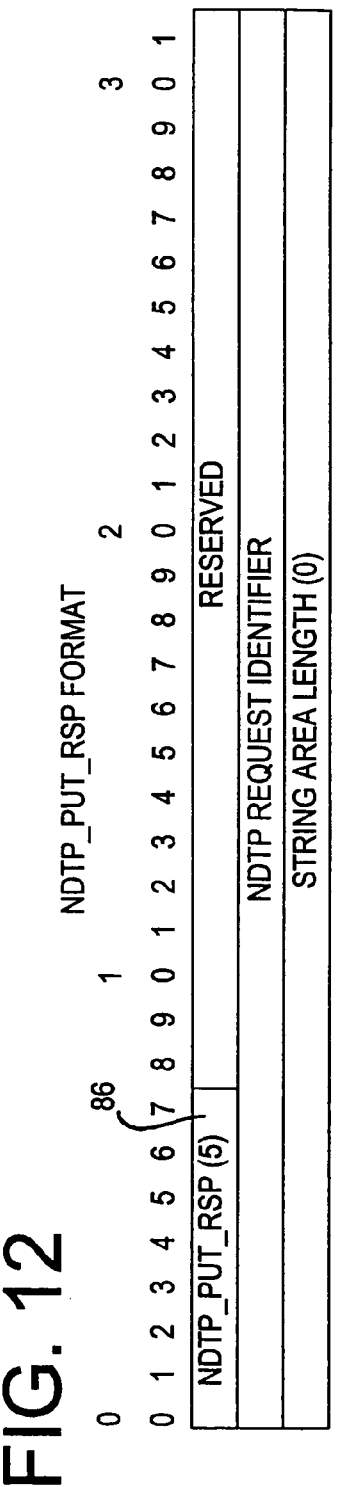
FIG. 12 is a layout of one presently preferred NDTP_PUT_RSP message.

The NDTP_PUT_RSP message has a message operation code 86 of 5, and zero NDTP strings. This layout is shown diagrammatically in FIG. 12.

NDTP_DEL Format

Figure 13:
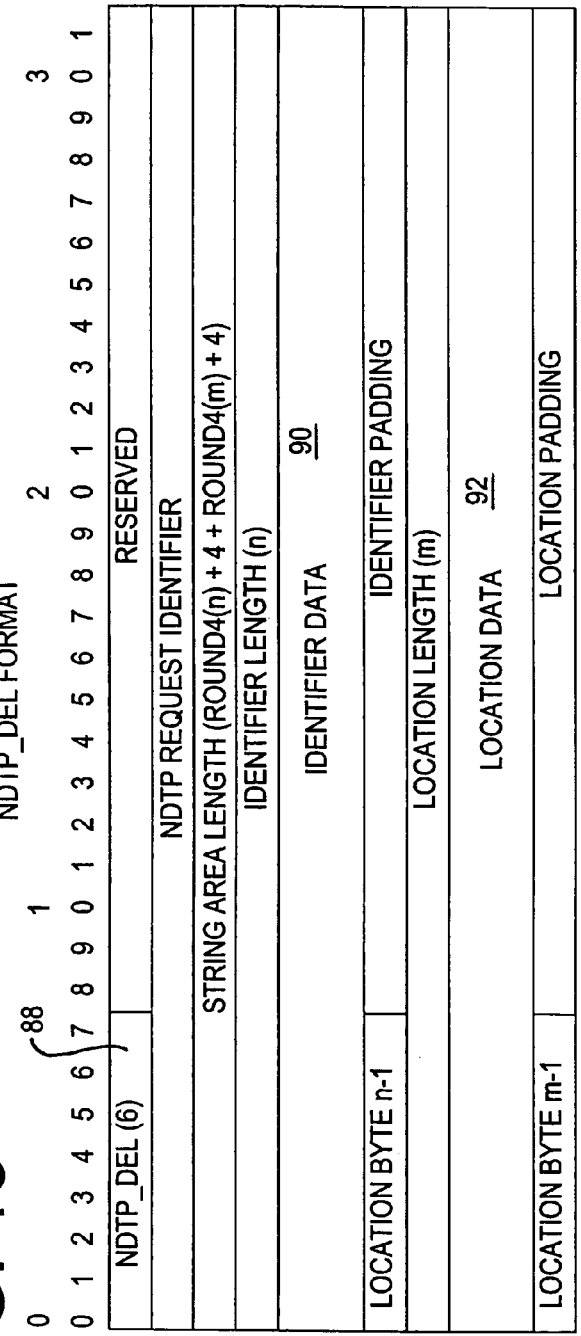
FIG. 13 is a layout of one presently preferred NDTP_DEL message.

The NDTP_DEL message has a message operation code 88 of 6, and two NDTP strings 90, 92. The first string 90 is the identifier from which to delete a location association, and the second string 92 is the location to delete. This layout is shown diagrammatically in FIG. 13.

NDTP_DEL_RSP Format

Figure 14:
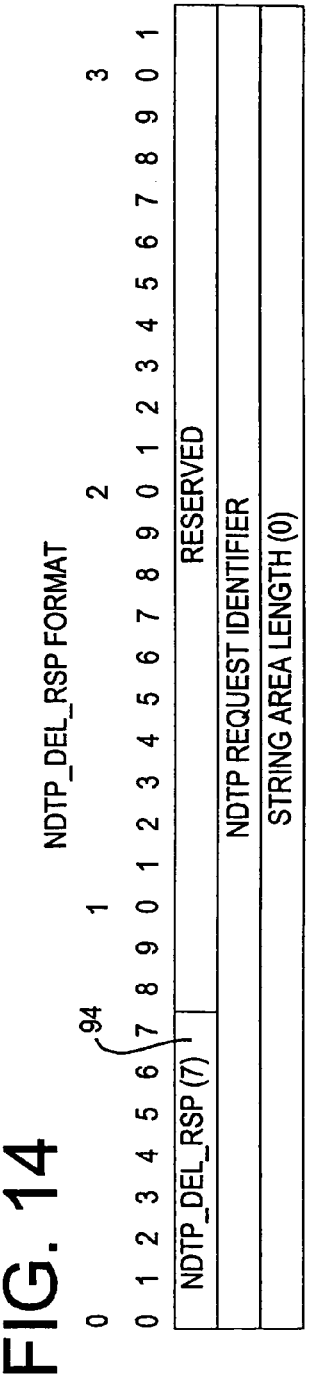
FIG. 14 is a layout of one presently preferred NDTP_DEL_RSP message.

The NDTP_DEL_RSP message has a message operation code 94 of 7, and zero NDTP strings. This layout is shown diagrammatically in FIG. 14.

NDTP_UPD Format

Figure 15:
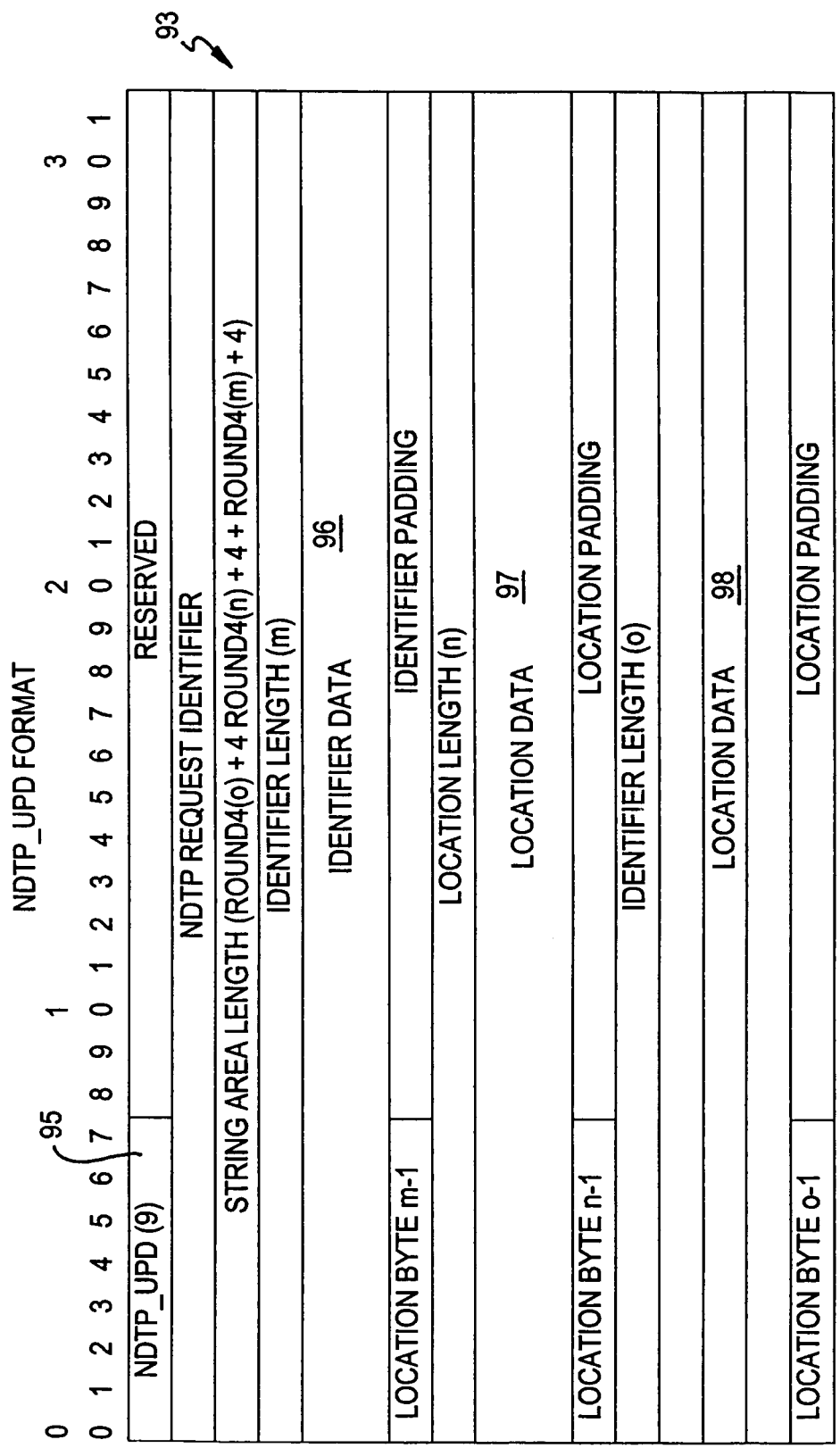
FIG. 15 is a layout of one presently preferred NDTP_UPD message.

The NDTP_UPD message 93 has an operation code 95 of 9 and three NDTP strings. The first string 96 is the identifier from which to update the location association. The second string 97 is the location to delete. The third string 98 is the location to add. This layout is shown diagrammatically in FIG. 15.

NDTP_UPD_RSP Format

Figure 16:
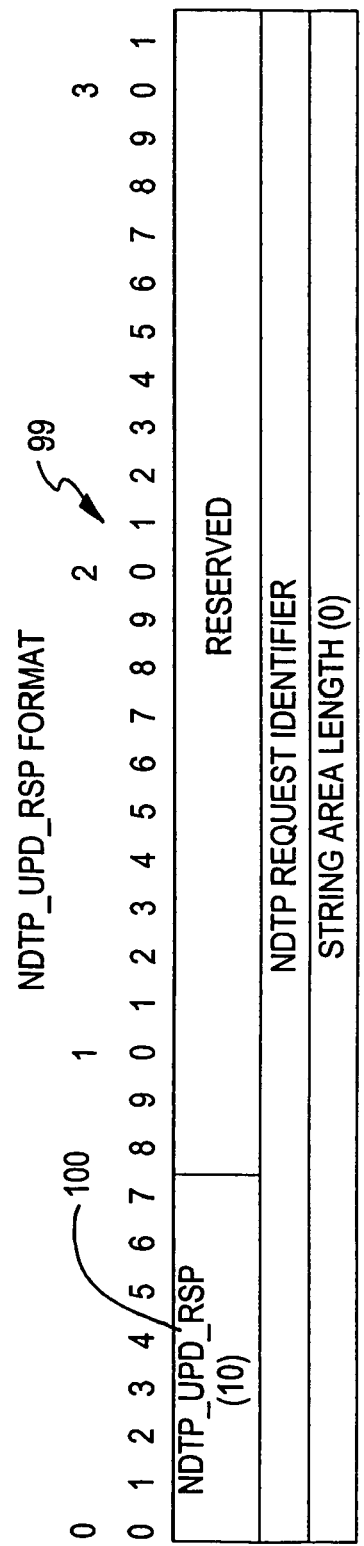
FIG. 16 is a layout of one presently preferred NDTP_UPD_RSP message.

The NDTP_UPD_RSP message 99 has an operation code 100 of 10 and zero NDTP strings. This layout is shown diagrammatically in FIG. 16.

A general description of the usage and operation of these protocol messages is provided below.

NDTP_GET Transaction

The NDTP_GET message contains a single NDTP string which is the identifier for which associated data locations are requested.

```
typedef struct ndtp_get {
    ndtp_hdr_t hdr;
    ndtp_str_t key;
} ndtp_get_t;
```

The NDTP_GET_RSP message contains zero or more NDTP strings which are the locations associated with the NDTP identifier:

```
typedef struct ndtp_get_rsp {
    ndtp_hdr_t hdr;
    uint32_t rsps;
    ndtp_str_t values[ ];
} ndtp_get_rsp_t;
```

NDTP_PUT Transaction

The NDTP_PUT messages contains two NDTP strings which are (1) the NDTP identifier and (2) the NDTP location which is to be associated with the NDTP identifier.

```
typedef struct ndtp_put {
    ndtp_hdr_t hdr;
    ndtp_str_t key;
    ndtp_str_t data;
} ndtp_put_t;
```

The NDTP_PUT_RSP message has no NDTP strings, and simply indicates that the requested identifier/location association was added:

```
typedef struct ndtp_put_rsp {
    ndtp_hdr_t hdr;
} ndtp_put_rsp_t;
```

The requested identifier/location association is added in addition to any other associations already maintained by the NDTP server. If the requested identifier/location association is already in effect, the NDTP_PUT still succeeds and results in an NDTP_PUT_RSP message.

NDTP_DELETE Transaction

The NDTP_DEL message contains two NDTP strings which are (1) the NDTP identifier and (2) the NDTP location which is to be unassociated with the NDTP identifier:

```
typedef struct ndtp_del {
    ndtp_hdr_t hdr;
    ndtp_str_t key;
    ndtp_str_t data;
} ndtp_del_t;
```

The NDTP_DEL_RSP message has no NDTP strings, and simply indicates that the requested identifier/location association was deleted.

```
typedef struct ndtp_del_rsp {
    ndtp_hdr_t hdr;
} ndtp_del_rsp_t;
```

If the requested identifier/location association is not in effect, the NDTP_DEL still succeeds and results in an NDTP_DEL_RSP message.

NDTP_RDR_RSP Message

NDTP supports a distributed server implementation where the NDTP client selects the appropriate server from a table of servers based upon a distribution function computed from the identifier. This distribution function is preferably a standard hash function, for example the hashpjw function presented by Aho, Sethi and Ullman in their text Compilers, Principles, Techniques and Tools. Alternatively, when interest so dictates, NDTP allows applications to provide a customized function as an alternative to a standard hash function.

The NDTP client can determine the size of the NDTP server table, which may have changed, and then update its local copy of the NDTP server table and attempt the NDTP transaction again, this time directed at the correct NDTP server. An NDTP redirection mechanism (described in detail below) preferably permits a client to store permanently only a single NDTP server address, and learn the complete NDTP server table size and contents from the NDTP_RDR_RSP message from the first NDTP request the client performs for which the identifier does not reside on a well-known server.

NDTP_UDP Transaction

The NDTP_UPD message is functionally a combination of the NDTP_PUT and NDTP_DEL messages described above. The NDTP_UPD_RSP message is also functionally the same as the NDTP_UPD_RSP and NDTP_DEL_RSP messages, where there is simply an indication that an identifier/location association update was made.

Network Front End

The NDTP server network front end preferably maximizes NDTP transaction throughput including concurrent NDTP requests from a single client as well NDTP requests from multiple concurrent clients.

Network Communication Mechanism

NDTP defines a transaction oriented protocol, which can be carried over any of a variety of lower level network transport protocols. TCP and UDP are currently supported, however any of a number of other protocols are also supportable.

TCP/IP: TCP/IP provides a ubiquitously implemented transport which works effectively on both local area and wide area networks. An NDTP client using TCP/IP preferably connects with the NDTP server at an established TCP port number, and then simply writes NDTP request messages through the TCP/IP connection to the server, which then writes NDTP response messages back to the client through the same TCP/IP connection in the reverse direction.

UDP/IP: For isolated NDTP transactions, depending upon the application and network infrastructure in use, it is beneficial to have the NDTP server employ UDP/IP, which is a widely available connectionless datagram protocol.

However, UDP/IP does not support reliable data transfer, or any congestion control mechanism. This means that NDTP clients using UDP/IP must implement reliability and congestion control maintaining transaction timeouts and performing exponential retry backoff timers, precisely analogous to the congestion control mechanism implemented by Ethernet, and other well known UDP protocols. Those skilled in the art will note that the NDTP protocol is stateless from the standpoint of the NDTP server, which means that there is no congestion control or reliability burden on the server; it is all implemented in a distributed manner by the NDTP UDP/IP clients. Still Higher Performance (ST): Both TCP/IP and to a lesser degree UDP/IP suffer from high host CPU overhead. Like the relatively long latency of TCP/IP, this host CPU consumption is considered just the "cost of doing business" where TCP/IP provides ubiquitous connectivity. If an NDTP server were running in a more constrained environment, where ubiquitous connectivity was not required, its absolute performance could be improved substantially by using a different protocol that is optimized to reduce CPU overhead and latency, such as the Scheduled Transfer (St) protocol.

NDTP Query Processing

In one embodiment, the NDTP server network front end preferably services NDTP query requests in a FIFO style by reading the NDTP_GET message, performing the lookup for the identifier in the NDTP server location store, and writing the NDTP_GET_RSP message. Each NDTP query is independent of any other NDTP transactions (other queries or updates), so multiple NDTP queries may be processed simultaneously on multiprocessor machines. The NDTP server permits this by not performing multiprocessor locking in the NDTP query processing path.

NDTP Update Processing

To maintain high performance on NDTP updates, the NDTP server network front end preferably supports multiple concurrent asynchronous update transactions. Each update is preferably performed automatically to avoid creating an inconsistent state in the location store. All NDTP updates are serialized through the location store mutator critical code sections.

When an NDTP update is processed, a call is made to the location store mutation function, which returns immediately indicating either that the mutation is complete, or that the completion will be signaled asynchronously through a callback mechanism. For updates which are not immediately completed, the network front end maintains a queue of NDTP updates for which it is awaiting completion. When completed, the network front end writes the NDTP update response messages for all completed updates back to the clients.

Multiple Connection Handling

The NDTP server network front end may be conditionally compiled to use either of two standard synchronous I/O multiplexing mechanisms, select or poll, or to use threads to prevent blocking the server waiting for events on individual connections. The threaded version of the NDTP server network front end preferably creates two threads for each NDTP connection, one for reading and one for writing.

TCP Mapping

NDTP is preferably carried on TCP in a standard manner. An NDTP/TCP client opens a connection with a server on a well-known port. The well-known TCP and UDP port numbers can be selected arbitrarily by the initial NDTP implementer. Port numbers that do not conflict with existing protocols should preferably be chosen. The client sends NDTP requests 60 to the server 12 on the TCP connection, and receives responses 62 back on the same connection. While it is permissible for a single client 14 to open multiple NDTP/TCP connections to the same server 12, this practice is discouraged to preserve relatively limited connection resources on the NDTP server 12. The asynchronous nature of NDTP should make it unnecessary for a client 14 to open multiple NDTP/TCP connections to a single server 12.

If protocol errors are detected on an NDTP/TCP connection, the NDTP/TCP connection should be closed immediately. If further NDTP/TCP communication is required after an error has occurred, a new NDTP/TCP connection should be opened. Some examples of detectable protocol errors include: Illegal NDTP message operation code; Nonzero String Area Length in NDTP_PUT_RSP or NDTP_GET_RSP; Inconsistent String Area Length and String Length(s) in NDTP_GET, NDTP_GET_RSP, NDTP_PUT, NDTP_DEL or NDTP_UPD; and Unexpected NDTP request identifier by client.

Due to the reliable nature of TCP, NDTP/TCP servers 16 and clients 12 need not maintain any additional form of operation timeout. The only transport errors that can occur will result in gross connection level errors. A client 12 should assume that any NDTP requests 10 for which it has not received responses 14 have not been completed. Incomplete operations may be retried. However, whether unacknowledged NDTP requests 10 have actually been completed is implementation dependent.

UDP Mapping

Unreliable Datagram Protocol (UDP) provides connectionless, unacknowledged datagram transmission. The minimal protocol overhead associated with UDP can deliver extremely high performance if used properly.

NDTP/UDP clients 14 send UDP datagrams with NDTP request messages 60 to a well-known UDP port (see above). NDTP/UDP servers 12 return NDTP response messages 62 to the client 14 selected local UDP port indicated in the NDTP/UDP datagram containing the requests 60. NDTP/UDP does not require any form of connection or other association to be established in advance. An NDTP interchange begins simply with the client request message 60.

For efficiency, the mapping of NDTP onto UDP permits multiple NDTP messages to be sent in a single UDP datagram. UDP datagrams encode the length of their payload, so when a UDP datagram is received, the exact payload length is available. The recipient of an NDTP/UDP datagram will read NDTP messages from the beginning of the UDP datagram payload until the payload is exhausted. Thus, a sender of an NDTP/UDP datagram is free to pack as many NDTP messages as will fit in a UDP datagram.

NDTP/UDP client 14 implementations that use the NDTP request identifier 64 for antialiasing should ignore (i.e., skip) NDTP messages within a NDTP/UDP datagram with invalid NDTP request identifier 64 values. Client 14 or server 12 NDTP/UDP implementations detecting any other protocol error should also preferably discard the remainder of the current NDTP/UDP datagram without processing any further NDTP requests from that datagram. Some examples of such detectable errors include: Illegal NDTP message operation code, Nonzero String Area Length in NDTP_PUT_RSP or NDTP_GET_RSP, Inconsistent String Area Length and String Length(s) in NDTP_GET, NDTP_GET_RSP, NDTP_PUT Or NDTP_DEL, and Inconsistent NDTP message length and UDP datagram length.

Because NDTP/UDP messages are limited to the length of a single UDP datagram payload, NDTP/UDP cannot be used to transfer long NDTP messages. For example, it would be difficult to send an NDTP_GET message with NDTP/UDP for a 64 K byte identifier.

Those skilled in the art will appreciate that network congestion is a highly dynamic property that is a function of network traffic from all sources through a network link and will vary over time over any given network path. An NDTP/UDP client 14 implementation can recover from network congestion by switching to NDTP/TCP after several failed retries using NDTP/UDP. Failure due to network congestion may be indistinguishable from failure due to UDP packet size limitations, but since the recovery strategy is the same in both cases, there is no need to distinguish these cases.

NDTP Redirection

NDTP handles NDTP server scaling with the NDTP's redirection mechanism, which is managed through an NDTP server 12, or set of such servers. This redirection mechanism allows arbitrary distribution of the data set across completely independent machines. The set of machines managing the NDTP server data set may be referred to as an NDTP server cluster 50, as shown in FIG. 5. The NDTP redirection mechanism exploits this by permitting the distribution of identifiers to location mappings across members of an NDTP server cluster. An advantage of distributing an NDTP server data set across independent machines is that both capacity and transaction rate scale can be increased. In one embodiment, each additional machine in an NDTP server cluster 50 linearly increases capacity, by adding main and secondary storage, and transaction rate, by adding processing power and network bandwidth (assuming a properly scalable network infrastructure is employed).

Each NDTP server 12 maintains a copy of the NDTP server map. An NDTP server will check each request it receives and verify that it is intended for itself. If it is not, it will respond to the client 14 with an NDTP Redirection Response message (NDTP_RDR_RSP), instead of responding with the normal operation completion message.

A client may misdirect a NDTP request because the NDTP server cluster may have been reconfigured since the client last obtained a copy of the NDTP server map. Thus, the NDTP_RDR_RSP message includes a complete copy of the current NDTP server map with which the client may determine the correct NDTP server for the given NDTP request.

In essence, the NDTP server maintains authoritative copies of the NDTP server map, whereas NDTP clients may have out-of-date copies of the NDTP server map. This property permits efficient reconfiguration of the NDTP server cluster. With the redirect message, an NDTP client can determine the size of the NDTP server table, which may have changed, and then update its local copy of the NDTP server table, and attempt the NDTP transaction again, this time directed at the correct NDTP server.

The NDTP redirection mechanism permits a client permanently to store only a single NDTP server address, and learn the complete NDTP server table size and contents from the NDTP_RDR_RSP from the first NDTP request the client performs which the identifier does not reside on the well known server. The NDTP backbone topology can change dynamically in a similar way to application server topology. Preferably, any time the cluster is reconfigured, only the NDTP servers are updated, rather than the (potentially) unbounded number of clients in the network.

The NDTP client can start out with an NDTP server map containing a single, well known, NDTP server entry: If the well-known NDTP server is not the NDTP server which is managing the portion of the NDTP server data set containing the identifier in the client request, an NDTP_RDR_RSP will be returned, and the client can update its local copy of the NDTP server map. Once a client has received a new NDTP server map, it will use it for the lifetime of the client application, or until it receives a new NDTP server map. The client may also put the most current NDTP server map into a persistent store, so that new invocations of the client application, or other clients of the same network, can begin operation without even a single NDTP_RDR_RSP.

If the client's saved NDTP server map becomes out-of-date, the server will return an updated NDTP server map the first time a client sends a NDTP request to an incorrect NDTP server. If a client NDTP request times out for some reason, this might mean that a machine in the current NDTP server map has been removed from the NDTP server cluster. In this case, to get the current NDTP server map the client may either (1) return to its base-line NDTP server map, containing the single well known NDTP server, or (2) direct the request to any other NDTP server in its current NDTP server map. Whether received directly, or by a map update via NDTP_RDR RSP, the client will obtain the desired location specifiers with at most two NDTP transactions.

The ability to scale NDTP service beyond a single server requires a mechanism to distribute portions of the identifier/location association set across multiple NDTP servers. The presently preferred embodiment for accomplishing this is to define a well-known function of the identifier and use this function to select from a set of NDTP servers. NDTP clients will preferably apply this well-known function to the identifier for each NDTP request, and send the NDTP request to the indicated NDTP server. This technique will effectively partition the set of all identifier/location associations across the NDTP servers. Each NDTP server will only maintain the portion of the total association set which corresponds to its particular identifiers. This NDTP server redirection mechanism permits construction of NDTP server clusters. It is reasonable to expect that the identifier index function will be defined when an NDTP server instantiation is implemented, but the actual list of NDTP servers will change from application to application and within a single application throughout the lifetime of the system.

In one embodiment, each of the clients and NDTP servers are programmed with a well-known function and the redirection message, as shown in FIG. 17(a) carries of table of NDTP server URLs. The NDTP_RDR_RSP message 101 has a message operation code of 8, and a description of the system that the client should send its message to. In one embodiment, the system is described by a list of strings, where each string is an NDTP URL (e.g. ndtp://server.name.com:24500).

If there is more than one list in the outer list, then the client is to select the appropriate inner list to send a message to by applying the following well-known function to the identifier and using the function result as an index into the NDTP server table. In one preferred embodiment, the well-known function applied is the hashpjw function presented by Aho, Sethi and Ullman in their text Compilers, Principles, Techniques and Tools:

```
uint32_t
hash (uint8_t *s, uint32_t slen, uint32_t size)
{
    uint32_t g;
    uint32_t i;
    unit32_t h = 0;
    uint8_t c;
    for (i = 0; i < slen; i++) {
        c = s [i];
        h = (h << 4) + c;
        g = (h & 0xf0000000);
        if (g) {
            h ^= g >> 24;
            h ^= g;
        }
    }
    return h % size;
}
```

In the above code sequence, the parameter size is the size of the hash table (the number of elements in the NDTP server URL table in the NDTP_RDR_RSP message), and is preferably a prime number. Those skilled in the art will appreciate that the same NDTP server may appear multiple times in the NDTP server URL table. For example, if the server URL table has 2039 elements, by putting one NDTP server URL in the first 1019 table elements, and a second NDTP server URL in the second 1020 table elements, the responsibility for the index will be split roughly in half.

A second variant of the NDTP_RDR_RSP function mechanism specifies that a general function description will be sent to the NDTP client in the NDTP_RDR_RSP message. The NDTP client will apply this function to the identifier and the output of the function will be the NDTP server URL to which to send NDTP requests for the particular identifier. The advantage of this technique over the well-known function approach is that it allows application-specific partitions of the identifier space. This can permit useful administrative control. For example, if General Electric manages all identifiers beginning with the prefix "GE", a general function can be used to make this selection appropriately. The disadvantage of using a general function is it may be less efficient to compute than a well-known function.

There are a variety of possible mechanisms for sending function descriptions. NDTP is expected to be applied in environments that make extensive use of the Java programming platform. Therefore the NDTP_RDR_RSP mechanism preferably uses a feature of the Java programming language called "serialized representation" to communicate generalized function in the NDTP_RDR_RSP message. A serialized form of a Java object is a stream of bytes that represents the precise state of the object, including its executable methods. For example, the Java Remote Method Invocation (RMI) mechanism uses serialized objects to send executable code to a remote platform for execution. The NDTP_RDR_RSP message contains the serialized form of an object implementing this Java interface:

```
interface NDTPRedirect Function {
    String selectServer(byte[ ] identifier);
}
```

Figure 17B:
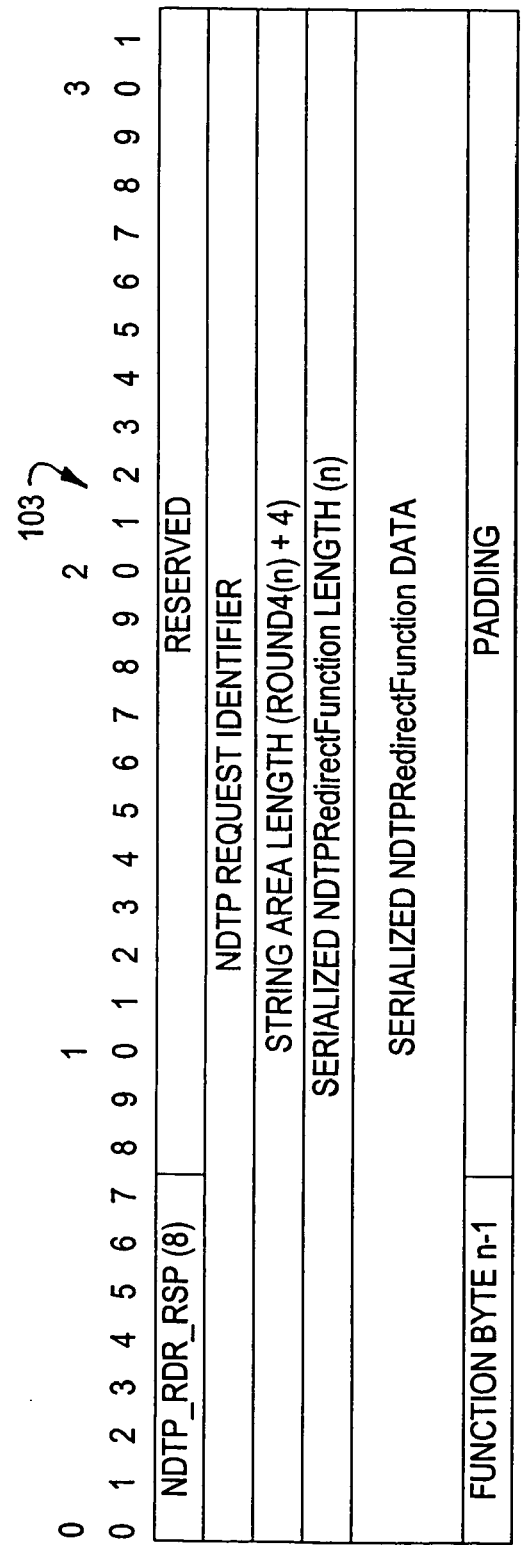
FIG. 17(b) shows a redirect function layout.

The format of the NDTP_RDR_RSP message 103 with a Java Serialized form of the NDTP redirection function is specifically identified in FIG. 17(b).

After the NDTP client has received a new server list, the client will direct further NDTP requests based on this updated NDTP server list until the NDTP server configuration changes again. An NDTP client may even save the current NDTP server list in non-volatile storage so that it can immediately select the correct NDTP server even after application or system restarts. Another possible alternative is for a client to remember only a single, well-known NDTP server, and update its NDTP server list every time the client restarts. These alternatives may be implemented as desired to accommodate design goals for a particular system.

Server Constellations

Figure 18:
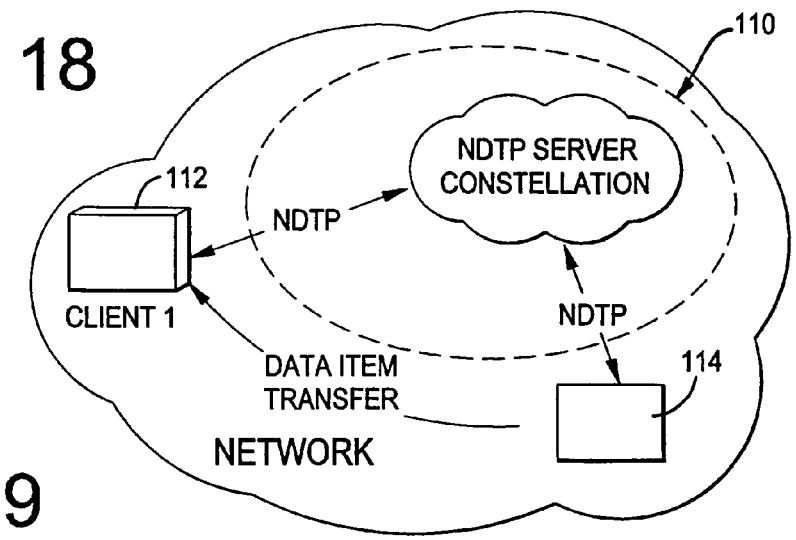
FIG. 18 is a system diagram showing an NDTP server constellation configuration and exemplary data flow paths.

The NDTP server organization also allows NDTP servers to be combined in various ways to build server constellations that offer arbitrary server performance scalability and administrative control of the location of positions of the identifier/data location relation mappings. FIG. 18 illustrates a basic transaction flow according to a preferred embodiment where a client 112 communicates NDTP protocol messages with an NDTP server constellation 110 (which may be one or more NDTP servers) and separately transacts with an application server 114. The basic communication flow in FIG. 18 may represent a client 112 adding, deleting, or updating an identifier/location association(s), and in turn adding, deleting, or updating corresponding data. The communication flow may represent a client 112 requesting an identifier/location association(s) from the NDTP server, which may be a server constellation construed in either of two forms (see FIGS. 19 and 20 ), and then querying directly based on the identifier/location association(s) received from the NDTP server. NDTP server constellations preferably have two basic organizational paradigms: Client-Centric and Server-Centric.

Client-Centric Approach

Figure 19:
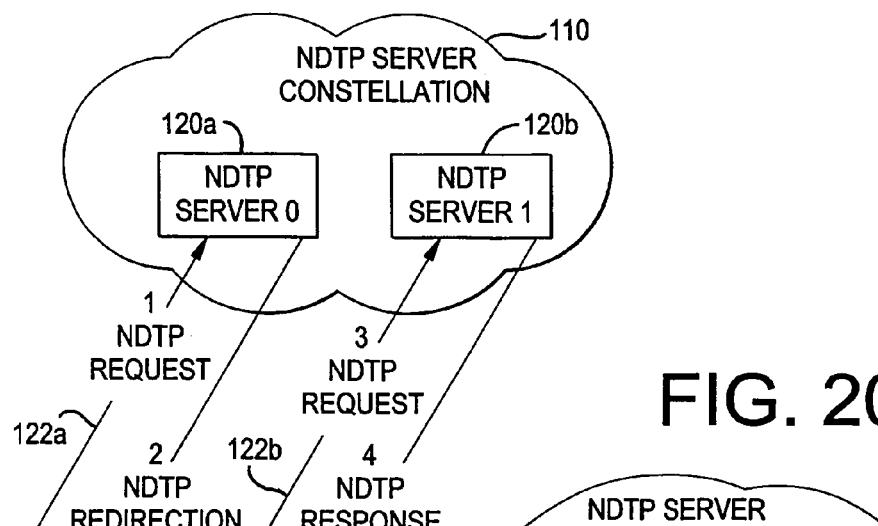
FIG. 19 is a system diagram showing a client-centric NDTP server constellation approach for redirection.

Referring to FIG. 19, a single client (not shown) asks a server 120a in the server constellation 110 for operations that the client desires executed (represented by arrow 1 in FIG. 19). As discussed above, if the client does not receive the data requested, it will receive a redirection response message (NDTP_RDR_RSP) from the contacted server 120a (arrow 2 ). The client then uses the information it receives to ask another server 120*b* for the operations the client wants to initiate (arrow 3). A successful response from the second server 120*b* is then sent to the client (arrow 4).

Server-Centric Approach

Figure 20:
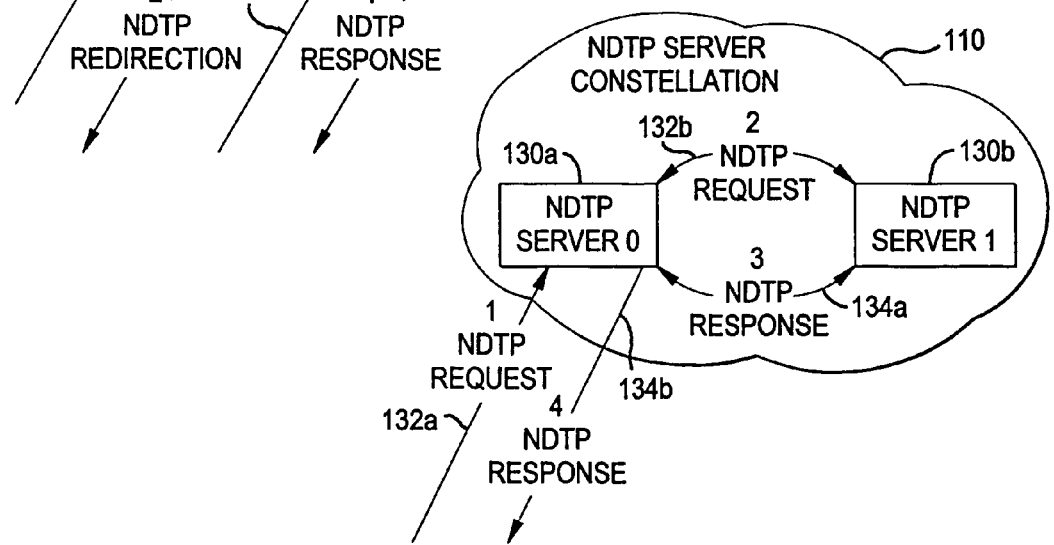
FIG. 20 is a system diagram showing a server-centric NDTP server constellation approach for redirection.

FIG. 20 shows the server constellation 110 characterizing "server-centric" functionality. In this figure, an NDTP server 130*a* (server0) receives a request 132*a* from a client (not shown). The server 130*a* (server0) passes the request to a second server 130*b* (server1), which is an appropriate server for the process, and the second server 130*b* returns a response 134*a* to the first server 130*a* (server0). If the second server 130*a* (server1) was not appropriate, it could pass the request to another server (not shown), and so on. Each NDTP server 130*a,b* will combine the results of NDTP requests 132*a,b* it has performed of other NDTP servers 130*a,b* with whatever responses 134*a,b* it generates locally for the original NDTP request 132*a*, and the combined response 134 *b* will be with the appropriate response for the original NDTP request 132 *a*.

An important aspect of this topology is that it pushes processing emphasis toward servers 130*a,b* rather than toward clients. Since location/identifier processing can be centralized, administration of the indices can be administered more conveniently in certain cases.

Hybrid Constellations

The simplest NDTP server constellation is a single server, and the protocol is designed to permit massive scale with a single or simple server constellation. Highly configurable installations are possible using "client-centric" or "server-centric" techniques. NDTP server constellations 110 composed of more than one NDTP server may use any combination of the two approaches for performance optimization and administrative properties. Client-centric and server centric approaches can be used to build NDTP server clusters, NDTP server trees, NDTP server trees of NDTP server clusters, or any other useful configuration.

Topology: Hierarchical and Clustered

Figure 21:
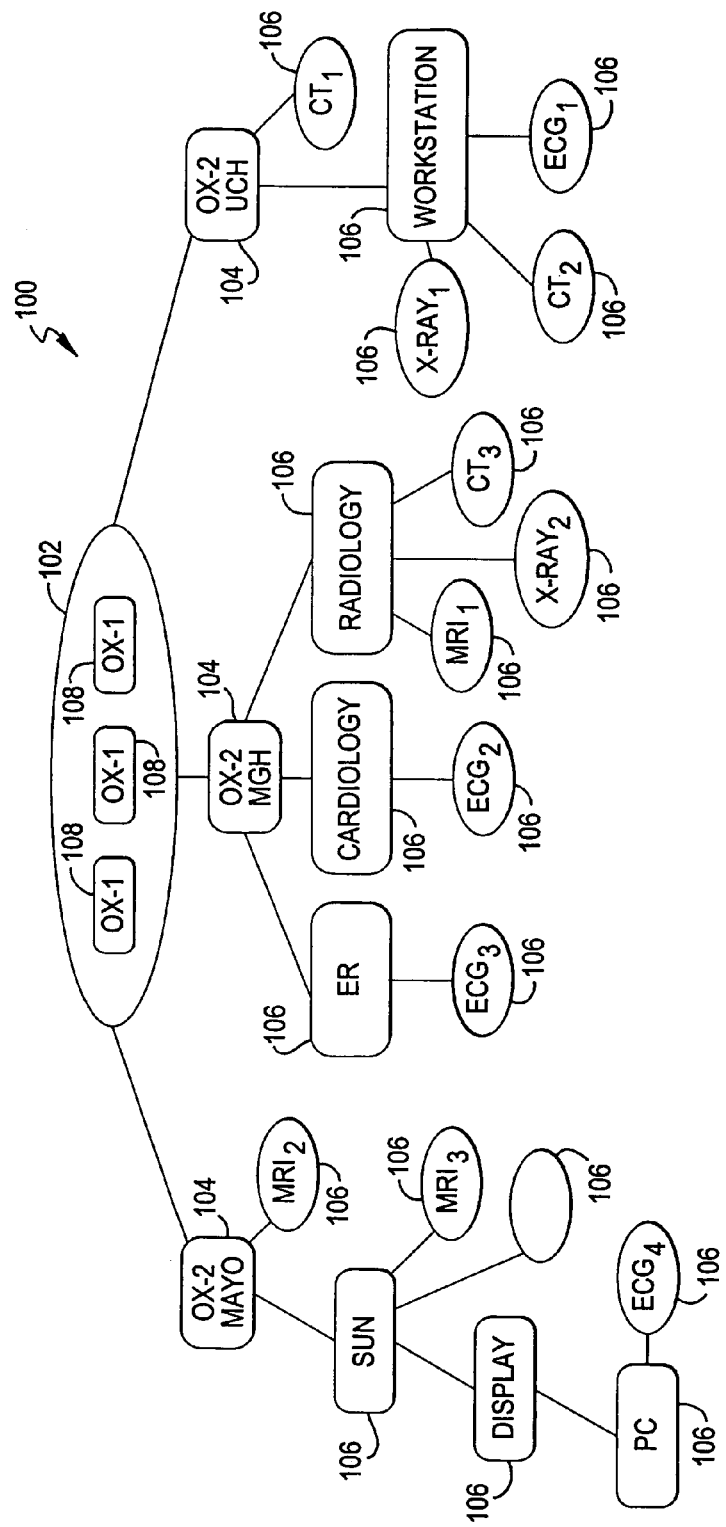
FIG. 21 is a system block diagram showing a multi-server implementation environment of the transfer protocol of the invention.

Hierarchical and clustered topologies may be created using a server-centric or client-centric approach. One illustration of a cluster topology 50 is shown in FIG. 5. A mixed topology containing hierarchical and clustered elements is shown in FIGS. 6 and 21. The primarily hierarchical topology of the embodiment of FIG. 21 can allow for a single administrative entity 102 to manage the NDTP sever cluster. An NDTP server hierarchy 100, such as illustrated in FIG. 21, permits identifier/location association data to be owned and physically controlled by many different entities.

Splitting & Coalescing Data Sets

The NDTP redirection mechanism discussed above offers flexibility in NDTP server cluster configuration with preferably little impact on clients. However, the NDTP server cluster itself must execute several steps to reconfigure the NDTP server data load. Methods for adding or removing an NDTP server from a running NDTP server cluster include splitting some portion of the data set from a running NDTP server cluster into one or more NDTP servers to be added to the cluster; coalescing some portion of the data set to a remaining NDTP server cluster; and propagating updated NDTP server maps efficiently to all NDTP servers in an NDTP server cluster. Preferably, these methods minimize interruption of service. Large batch-style updates are preferably avoided using the splitting and coalescing algorithm discussed below to handle large scale reconfiguration.

When reconfiguring NDTP server clusters, splitting and coalescing problems for an NDTP server are handled by checkpointing the current data set state and loading it into another instance of an NDTP server. In the case where a data set will be split, a set of identifiers is transferred to another NDTP server. In the case where a data set is coalesced, several NDTP server states are loaded on a single NDTP server cumulatively.

Figure 22:
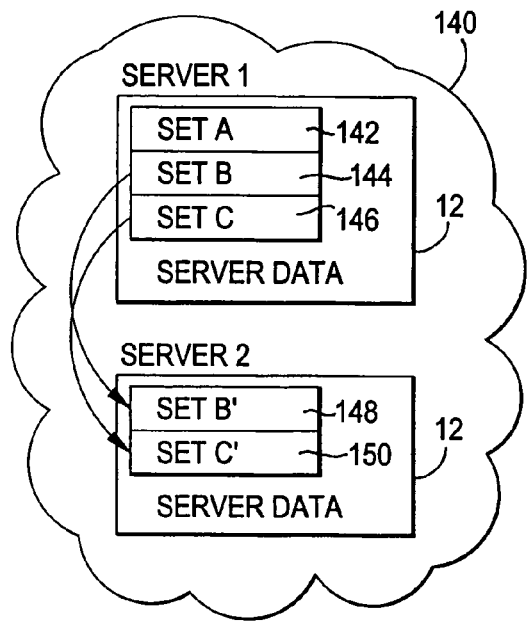
FIG. 22 is a block diagram of a splitting process in an NDTP server cluster.

Consider an example of splitting, as shown in FIG. 22, in which a given NDTP server cluster 140 having at least two NDTP servers 12 needs to reconfigure the distribution of identifier/location data among NDTP servers. If the identifier space needs to be split, whether for local policy reasons initiated by an administrator, or based on automatically monitored performance criteria such as transaction rate, storage capacity and etc., the splitting process begins by identifying the set of the data on Server 1, that will be transferred to Server 2. Referring to FIG. 22, Server 1 initially contains a total set of data consisting of Set A 142 and Set B 144. Assuming Server 1 has identified Set B as the data that needs to be split out to Server 2, Server 1 first checkpoints the data in Set B. Server 1 continues to operate normally with respect to Set A and will update (perform any of the NDTP add, delete, or update functions) without interruption. Server 1 also creates new set of data, Set C 146, which accumulates all operations directed to Set B 144 since the checkpoint of Set B 146 took place. Server 1 then copies Set B 144 to Set B' 148 on Server 2. After the copying of Set B 144 to Set B' 148 is complete, Server 1 freezes operations on Set C 146 and copies it to Set C' 150 on Server 2. Operation on Set B' 148 and Set C' 150 is then resumed on Server 2 and Sets B and C 144,146 are deleted from Server 1.

Preferably, the only interruption to the NDTP server activity in Server 1 or Server 2 is limited to the Set C and the time it takes to complete the copy step of Set C 146 to Set C' 150 while Server 1 freezes operations to Set C. Operations on the remaining data are preferably unaffected throughout the splitting process. NDTP lookup operations do not affect the checkpoints that are saved or loaded. Furthermore, if more than one NDTP server is already operating in the cluster, only the affected subset of the NDTP servers in an NDTP server cluster are interrupted during this process; the remainder of the NDTP server continues to operate undisturbed. An advantage that splitting and coalescing provides is the redistribution of identifier space without requiring reindexing, which is more expensive computationally.

When reconfiguring an NDTP server cluster, the new NDTP server map must be propagated to all NDTP servers in the cluster so that accurate NDTP redirection messages can be sent. An asynchronous mechanism is preferably used to supply the new NDTP server map. Preferably, the NDTP server transferring the data set will broadcast the new NDTP server map to all other NDTP servers in the cluster over its network connection, such as a TCP connection. In one embodiment, each server may maintain an internal table holding all server locations in memory. Preferably, server map size is selected for a likely maximum number of machines in the NDTP server and is a prime number suitable for use with a well-known function. In one embodiment, a server may appear more than one time on the server map. For example, if the initial NDTP server map size is established at 1023, and only a single NDTP server will be used to form the NDTP server cluster so that the single NDTP server machine appears 1023 times in the NDTP server map.

After splitting and coalescing one method of transferring the updated server map to other servers is to use a data structure containing a list or URL's with ranges of identifiers associated with each URL. In another embodiment, the new server map may be carried in a message having the same properties and format as the NDTP_RDR_RSP message (see FIG. 17(a)) but having a message code identifying the contents as a server-to-server transmission.

If an NDTP server is added by splitting an existing portion of the data set without changing the NDTP server map size, only the new and old NDTP servers need immediately know about the modification of the NDTP server map. The NDTP servers uninvolved in the split will forward all requests for the data set now existing on either the new or the old NDTP server. The old NDTP server will then return an NDTP_RSP_RDR with the new NDTP server map, when responding to requests for the data set that now exists on the new NDTP server. A new NDTP server map will eventually be propagated to all NDTP servers using the NDTP server map propagation mechanism. The NDTP redirection mechanism allows this propagation to be asynchronous to the actual NDTP server cluster reconfiguration. In one preferred embodiment, the server map is transmitted from a server involved in a splitting or coalescing operation to all other servers in a cluster.

Removing NDTP Servers from Server Clusters

The most efficient way to remove NDTP server machines from an NDTP server cluster includes ensuring either sending clients redirects or aliasing the NDTP server. Using redirects, the removed NDTP server machine remains a citizen of the NDTP server cluster, does not manage any particular data set, and simply responds with NDTP_RDR_RSP requests with the new NDTP server map. In effect, this simply returns a forwarding address. Using aliasing, the network address of the removed NDTP server is assigned as an alias to a remaining, active member of the NDTP server cluster.

The methods for splitting data on NDTP servers and removing NDTP servers entirely permit flexibility for coalescing data in NDTP servers. If, for example, an NDTP server needs to transfer some of its data due to performance limitations (physical storage capacity limits, transaction rate limitations, etc.), the target NDTP server for receiving the transferred data set may already contain an active data set. Preferably, copying a subset of data from a first server to a second server already actively processing its own data proceeds according to the splitting process as described above. Utilizing the NDTP server operations and system configuration flexibility described above, numerous applications of the preferred data location system are contemplated.

Content Management

Figure 23:
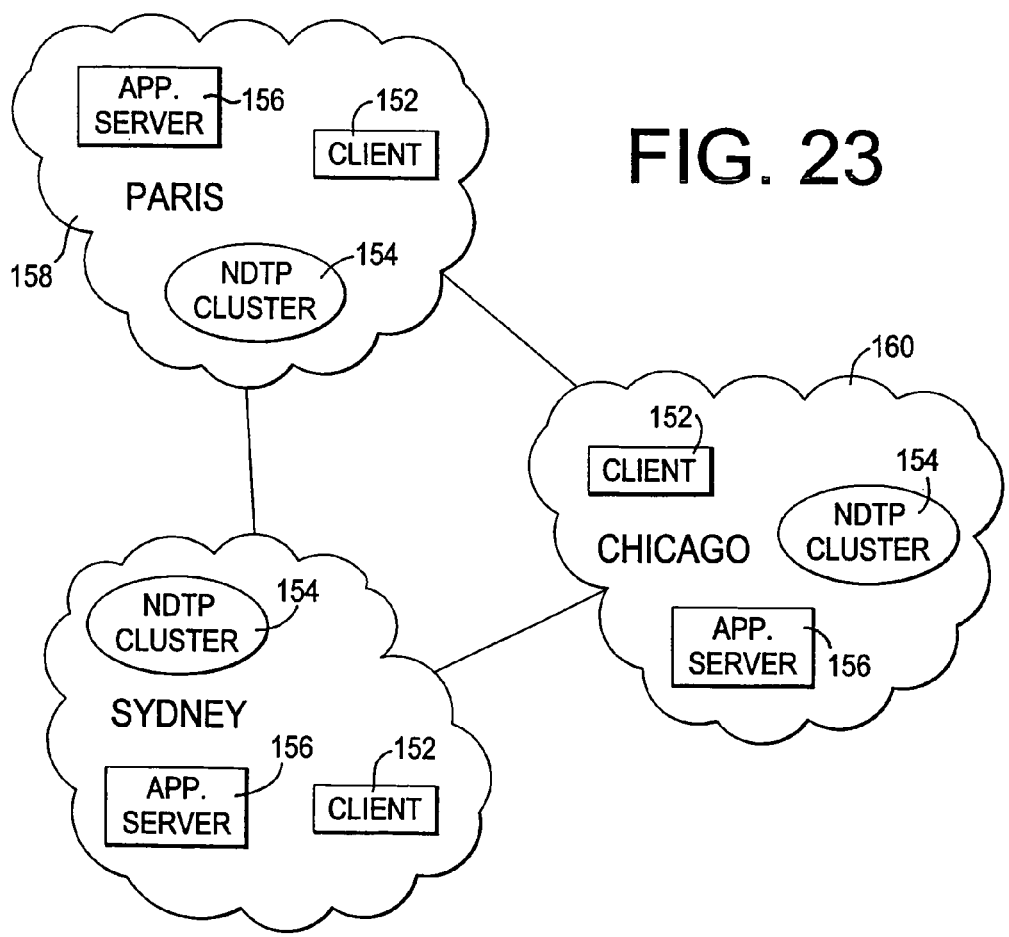
FIG. 23 illustrates an embodiment of a content management/object management system configuration incorporating an NDTP server network.

Referring to FIG. 23, a geographically dispersed network of clients 152, NDTP servers 154 and application servers 156 is shown. Each of the clients, NDTP servers and application servers may each represent one or multiple systems. The application servers 156 contain substantive content in one or more forms (text, graphics, etc.) to which the clients 152 require access. The NDTP servers may maintain tables of identifiers, where each identifier represents one or more instances of a specific file, and the associated location or locations of that file. The identifier may be a Universal Resource Identifier (URI) and the location may be a URL for the specific application server 156 at which the substantive content may be accessed, or any other addressing convention. A client at a Paris location 158 may request the location of information relating to an identifier from the local NDTP cluster 154 and receive a URL for an application server 156 residing in a Chicago location 160. The information for the URI maintained at the Chicago URL is preferably cached at the client 152 in the Paris location on a per instance basis such that the file is available for the client in Paris for the duration of that client's needs. In one embodiment, the NDTP server cluster in the Paris location preferably maintains a record of the number of requests for that particular URI and, if the URI is the subject of a predetermined number of queries, the frequently requested content at the URL in Chicago is automatically transferred to an application server in the Paris location 158 or copied to an application server in the Paris location. Using the NDTP delete, add, or update operations, the NDTP server clusters in Paris and Chicago preferably update the location information for the URI and asynchronously propagate the new server maps to the remaining NDTP servers.

Object Management

In another embodiment, the same geographical arrangement of data and clients applies to object management, where the object is a programming element or file. Examples of some objects include C++ objects or portions of programming toolkits that various geographically dispersed clients may wish to access in executing a program. By assigning each object a unique identifier and maintaining the location information in NDTP servers, efficient transfer of the object may be achieved and accurate accounting of where the object has been, or currently resides, is obtainable. In particular, embodiments of the present invention are well suited to handle high transaction volume for tracking the objects.

Tracking and Sensing

Figure 24:
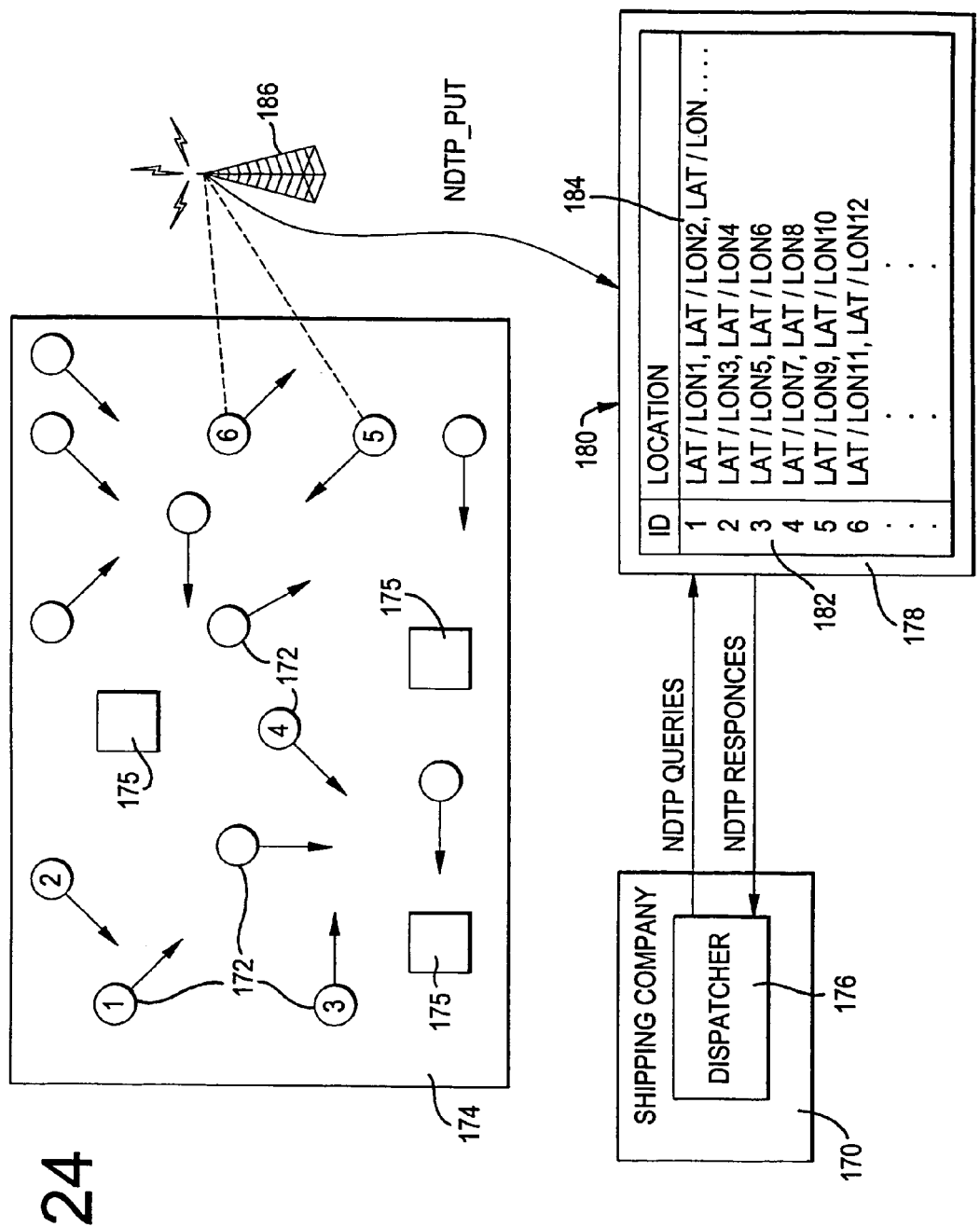
FIG. 24 illustrates an embodiment of a vehicle tracking system incorporating an NDTP server.

The NDTP protocol and network configurations discussed above may be applied to any one of a number of physical object (animal, telecommunications devices, troop location, package, family member, part, product and etc.) tracking applications. Referring to FIG. 24, one embodiment of a vehicle tracking application is shown. A shipping company 170, which may be any number of moving company, airborne delivery or ground delivery services, may track company vehicles 172 in a delivery territory 174 in order to maintain delivery fleet status or optimize fleet deployment to, for example, select the best vehicle to pick-up materials at designated pick-up location 175. A dispatcher 176 may access an NDTP server 178 having a location store 180 of information containing identifiers 182 corresponding to individual vehicles 172 and a list of locations 184 associated with the identifier for each vehicle. In one embodiment, the vehicles may be automobiles and the identifier assigned to the vehicles may be the unique vehicle identification number (VIN) assigned by automobile manufacturers to the automobiles they produce.

The location store 180 may be maintained such that only the most recent geographic location (e.g. latitude and longitude) is associated with a vehicle, or the table may be maintained to continuously receive current location information for each vehicle at predetermined intervals so that vehicle travel history, speed, heading and other types of information may be obtained with the location information for a vehicle. In one embodiment, the vehicles 172 may each be equipped with a Global Positioning System (GPS) receiver and a transceiver that is programmed to automatically broadcast position information, or any other location identifying technology. The broadcasts may be picked up through a network, such as a cellular network 186 and transmitted to the NDTP server 178. The broadcasts contain the vehicle identifier and geographic information, such as latitude/longitude or any other geographic measure, that is then appended to the appropriate portion of the indexed table 180. An advantage of the NDTP server application in the vehicle tracking example illustrated in FIG. 24 is that the NDTP server performance may be used to track large numbers of vehicles at high update rates.

Mobility Management, With and Without Presence

Figures 25, 26:
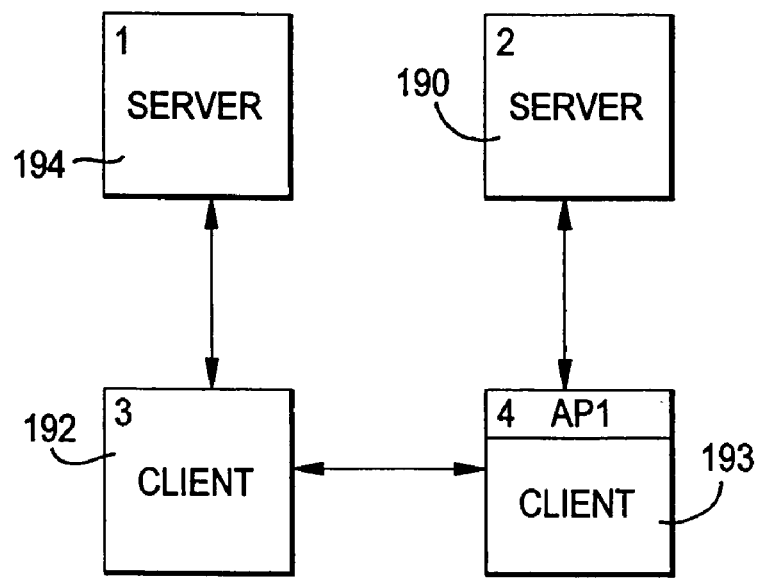
FIG. 25 illustrates an embodiment of a mobility management application incorporating an NDTP server.
FIG. 26 illustrates an embodiment of a location store format for the NDTP server of FIG. 25.

In another embodiment, the NDTP protocol and network configurations discussed above may be applied to mobility management applications. Additionally, the mobility management applications may include the ability to indicate whether a device is available for interaction ("presence"), where device availability is tracked in addition to the physical location of a device. For example, as illustrated in FIG. 25, an NDTP server 190 may maintain a set of identifier/location associations on the physical location and availability of portable devices belonging to a particular user. The portable devices 192 may be, in one embodiment, any type of cellular enabled device, or other wireless mobile device, such as personal digital assistants (PDA), notebook computers with cellular modems, mobility-enabled wrist watches, mobile telephones, and etc. The portable devices 192 preferably include location service enabled software 193, such as standard plug-in software modified to translate NDTP and the service protocol of the third party tracking mechanism. In the embodiment of FIG. 25, a third party tracking mechanism, such as a mobile network tower 194, communicates with an NDTP server 190 to update the whereabouts and accessibility of a person through one or more portable devices. In FIG. 25, the mobile network tower 194 communicates with the NDTP server via the portable device. In other embodiments, either the third party tracking mechanism or the portable device 192 may be modified, through a standard API, to directly communicate with the NDTP server. In yet another embodiment, a proxy server (not shown) may provide protocol translation functionality to allow the third party tracking mechanism and/or the portable device to communicate directly with the NDTP server 190 without the need to modify the third party tracking system or the portable device.

As illustrated in FIG. 26, the location store 196 maintained on the NDTP server 190 may be configured to have identifiers 198 such as a person's name, associated with locations 200 which may be a device address 202 paired with a presence (availability) 204 indicator. Whenever a portable device 192 is activated, the mobile network tower 194 will inform the NDTP server 190 of the existence of the portable device and its availability. In the given example, a "1" represents an active device and a "0" represents an inactive device. Each time a portable device associated with a person's identifier is activated (and/or deactivated depending upon implementation), the NDTP server location store 196 will be updated by the mobile network tower 194 with the device address. The device address may be in the form of electronic address or other type of location. Using this system, a party attempting to contact the person or entity represented by the identifier "Alice" in the location store 196 may access the NDTP server to receive the address for the most recently activated device, the address for all active devices, and/or addresses for all devices associated with "Alice".

Generic Naming and Addressing

The NDTP system and protocol described above may provide a specialized database designed to solve general naming and addressing needs. NDTP is designed for use in the larger context of a distributed database system including, but not limited to, addressing and namespace services. As such, it supports an architecture in which information about where data associated with particular application entities can be managed and obtained independently of the data itself. One way to understand this is as a highly dynamic domain name service (DNS) for data. DNS maintains a mapping between names and machines. NDTP and its associated servers maintain a mapping between identifiers and locations. The identifier/location mapping maintained by NDTP servers is much more dynamic (suitable for frequent updates), than the domain name/IP address mapping maintained by DNS. NDTP may be viewed in this respect as fully generalized name service suitable for any kind of service and not restricted to a specialized service.

Mobile Telephone Tracking and Dynamic Telephone Numbers

In other applications of the NDTP protocol and system discussed above, mobile telephone tracking and dynamic telephone number applications may be implemented. With respect to mobile telephone tracking, an NDTP server location store may use the electronic serial number (ESN) of, for example, cellular phones as identifiers, and the cellular tower translation encoding or latitude longitude of the phone as the location. Advantages of tracking mobile phone location through an NDTP server may include speed of information access and the ability to construct an audit trail showing where a cell phone has traveled. In another embodiment, a cellular telephone customer may be mapped to a new service provider by mapping the cell phone ESN to an appropriate location of an instruction set that will convert the cellular telephone customer's telephone number to a new service provider. In this manner, the cellular telephone customer may switch providers without having to obtain a new telephone number.

With respect to dynamic telephone number functionality, a telephone system organized by NDTP would permit telephone service customers to create and delete unique communication roles freely, for any purpose. For example, a customer may create a new communication role identifier to give to a service provider, such as an auto mechanic, to permit contact during the service. After service completion, the customer may delete the communication role identifier, thereby preventing unwanted subsequent contact, such as telemarketing solicitation. In another embodiment, this communication role identifier property can be employed to dynamically control customer-initiated contact. Telephone-based service providers, such as customer relationship management, computer support, medical services, etc., can dynamically control customer initiated contact. For example, a customer with an active case could dial a unique communication role identifier which would be routed directly to the appropriate support specialist until the incident is resolved. The person reached by the customer's unique communication role identifier can be changed by the service provider as the service cycle progresses. After incident resolution, the service provider may delete the communication role identifier, thereby preventing the customer from gaining additional, inappropriate access to support specialists. The dynamic telephone number application of NDTP may be used on various systems, including voice over Internet protocol (VOIP) systems, to allow users to readily map and unmap single use, or limited use, addresses to a desired communication path.

As described above, a method and system for managing data location information in a network has been disclosed having an easily scaleable architecture that permits rapid operation and flexibility for expansion and reconfiguration of service. The system is based on a Network Distributed Tracking Protocol that runs on top of any stream (e.g. TCP) or datagram (e.g. UDP) network transport layer. With NDTP, the system supports a network service that efficiently manages mappings from each individual identifier (definable using any format, size, encoding, etc.), to one or more locations (which are also definable using any format, size, encoding, etc.). In one embodiment, the identifiers and locations may be formatted as strings. NDTP permits clients to manipulate identifier/location associations, and request the current set of locations for an identifier from protocol servers. The servers in the network may be reconfigured to change the data set currently stored in one or more servers in response to performance goals or limitations.

Regardless of the expected system context of NDTP in a distributed database, those skilled in the art will appreciate that NDTP can be used for any application in which one-to-one or one-to-many associations among identifier and location associations are to be maintained and accessed on a network.

It is to be understood that a wide range of changes and modifications to the embodiments described above will be apparent to those skilled in the art, and are contemplated. It is therefore intended that the foregoing detailed description be regarded as illustrative, rather than limiting, and that it be understood that it is the following claims, including all equivalents, that are intended to define the spirit and scope of the invention.

We claim:

1. A system having a plurality of location servers for managing location information and providing location information to location queries, the system comprising:
    a first location server containing a first set of location information corresponding to at least one entity, the location information comprising an identifier and at least one location string associated with the identifier, wherein the identifier identifies an entity and the location string specifies a location of data pertaining to the entity
    a second location server comprising a second set of location information, wherein at least a portion of the second set of location information differs from the first set of location information; and
    programming logic stored on each of the location servers responsive to a location query identifying a desired entity to return a location message, the location message comprising at least one location of data pertaining to the desired entity, if the location server receiving the location query contains location information for the desired entity.

2. The system of claim 1, wherein the at least one location comprises a plurality of geographic locations, each of the geographic locations representing a position of the entity at a different time.

3. The system of claim 1, wherein the programming logic further comprises logic responsive to the location query to return one of a location message or a redirect message, wherein the location server receiving the query returns the location message if the queried location server contains location information for the desired entity, and wherein the queried location server returns a redirect message if the queried location server lacks location information for the desired entity, the redirect message comprising information for finding a location server known to have location information relevant to the location query.

4. The system of claim 3, wherein the information for finding the location server known to have location information relevant to the location query comprises a list of location servers and a corresponding list of each of the entities having location information on the location servers.

5. The system of claim 1, wherein each of the location servers stores at least a portion of the location information on a persistent storage device.

6. The system of claim 1, wherein the location information in the location server is maintained in an indexed location store indexed by a hash table.

7. The system of claim 6, wherein the location query identifying the desired entity comprises a unique identifier for the desired entity, and wherein the programming logic stored on the location server further comprises programming logic for applying an index function to the unique identifier to retrieve at least a portion of the location information associated with the unique identifier in the indexed location store.

8. The system of claim 7, wherein the location query is received at a location server in a first node and wherein the redirect message comprises a list of at least one other location server in a node other than the first node that may have location information relevant to the location query.

9. The system of claim 1, wherein the plurality of location servers are arranged in a network topology having a plurality of nodes organized in a logical hierarchy, wherein each node comprises at least one location server and wherein each node is connected to at least one other node in the logical hierarchy.

10. A system having a plurality of location servers for managing location information and providing location information to location queries, the system comprising:
    a plurality of location servers containing location information corresponding to a plurality of entities, the location information formatted according to a transfer protocol configured for manipulating location information, and comprising at least one application server address, wherein the plurality of location servers are arranged in a cluster topology such that each location server contains a unique set of location information of an aggregate set of the location information; and
    programming logic stored on each of the plurality of location servers responsive to a location query for a desired identifier to return one of a location message, wherein a queried location server returns a location message if the queried location server contains location information for the desired identifier, and a redirect message if the queried location server does not contain location information relevant to the desired identifier, wherein the redirect message comprises information for finding a location server having location information related to the desired identifier.

11. The system of claim 10, wherein the location information comprises geographic location information.

12. The system of claim 10, wherein the location information comprises network address information.

13. The system of claim 12, wherein the network address information comprises a network address of a data repository containing data pertaining to the desired identifier.

14. A method of handling location queries in a network, the network comprising a plurality of location servers, each location server containing a unique set of location information of an aggregate set of location information correlating each of a plurality of identifiers with at least one location, the method comprising:
    receiving a location query from a client at one of the plurality of location servers, the location query requesting an entity's location;
    sending a location response message to the client if the queried location server contains location information relevant to an entity identified in the query, the location response message comprising location information identifying at least one application server containing information relevant to the entity identified in the query; and sending a redirect message to the client if the queried location server does not contain data location information relevant to the entity identified in the query, the redirect message comprising information for finding a location server storing the entity identified in the query.

15. The method of claim 14, further comprising applying information in the location query from the client to an indexing function to determine if the queried location server contains location information relevant to the entity identified in the query.

16. The method of claim 15, wherein each of the plurality of location servers comprises an indexed table of identifiers and associated locations, and wherein applying information in the location query comprises applying an identifier in the location query to a hash function.

17. A method of scaling at least one of capacity and transaction rate capability in a location server in a system having a plurality of location servers for storing and retrieving location information, wherein each of the plurality of location servers stores unique set of location information of an aggregate set of location information, the method comprising:

providing a transfer protocol configured to transport identifier and location information, the location information specifying the location of information related to the identifier;

storing location information formatted according to the transfer protocol at a first location server;

receiving an identifier and a location relevant to the identifier at the first location server;

storing the received location in a location store at the first data location server, the location store comprising a plurality of identifiers, each identifier associated with at least one location, wherein the received location is associated with the received identifier in the location store; and transferring a portion of the identifiers and associated locations to a second data location server when a performance criterion of the first location server reaches a predetermined performance limit.

18. The method of claim 17, wherein receiving an identifier and a location comprises receiving the identifier and the location at the first location server from an application server, wherein the location comprises an address for the application server.

19. The method of claim 17, wherein receiving an identifier and a location comprises receiving the identifier and the location at the first location server from a physical object, wherein the identifier identifies the physical object and wherein the location comprises a geographic location for the physical object.

20. The method of claim 19, wherein the physical object comprises a vehicle.

21. The method of claim 19, wherein the physical object comprises a portable telecommunications device.

22. The method of claim 17, wherein transferring a portion of the identifier and location associations comprises:

identifying a portion of identifier and location associations on the first location server to be transferred to the second location server and identifying a data set state of the identified portion at an initial time;

copying a data set for the identified portion corresponding to the identified data set state from the first location server to the second location server and maintaining a second data set containing changes to the identified portion since the initial time;

identifying a data set state for the second data set;

ceasing operation of the first location server with respect to the identified portion and copying the second data set to the second location server, wherein the second data set corresponds to the identified data set state for the second data set; and initiating operation of the second location server for the identified portion of identifiers and location associations.

23. The method of claim 17, wherein the performance criterion comprises an amount of available persistent storage space in the first location server.

24. The method of claim 17, wherein the performance criterion comprises a transaction rate limit.

25. The method of claim 17, wherein the transaction rate limit comprises a processor speed limit.

26. The method of claim 17, wherein the transaction rate limit comprises a network connection bandwidth limit.

27. The method of claim 17, further comprising transmitting a location server map from the first location server, the location server map comprising information identifying the second location server and a list of identifiers associated with the second location server.

28. The method of claim 27, wherein the first and second location servers are part of a location server cluster comprising a plurality of location servers, and wherein transmitting the location server map comprises transmitting the location server map to each of the plurality of data location servers asynchronously.

29. The method of claim 27, wherein transmitting a location server map comprises transmitting the location server map to a client in response to query received at the first location server from the client regarding an identifier that is not resident on the first location server.

30. The method of claim 17, wherein transferring a portion of the identifiers and associated locations to a second location server when a performance criterion of the first data location server reaches a predetermined performance limit further comprises monitoring the performance criterion and automatically transferring the portion of identifiers and associated locations when the first location server reaches the predetermined limit.

31. A system for managing location information and providing location information to location queries, the system comprising:

a location server operating in accordance with a transfer protocol, the transfer protocol comprising instructions for manipulating an identifier and at least one location associated with the identifier, wherein the identifier uniquely specifies an entity and wherein each location specifies a location of data in a network pertaining to the entity, the location server containing location information corresponding to at least one entity and formatted according to the transfer protocol, and wherein the location of data for the location comprises an application server in communication with the network; and programming logic stored on the location server responsive to a location query identifying a desired entity to return a location message, the location message comprising locations associated with the desired entity, wherein the location server returns the location message if the location server contains location information for the desired entity.

* * * * *